United States Patent
Kotato et al.

(10) Patent No.: US 9,231,276 B2
(45) Date of Patent: Jan. 5, 2016

(54) NONAQUEOUS ELECTROLYTIC SOLUTIONS AND NONAQUEOUS-ELECTROLYTE BATTERIES

(75) Inventors: Minoru Kotato, Inashiki-gun (JP); Shinichi Kinoshita, Inashiki-gun (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 13/353,803

(22) Filed: Jan. 19, 2012

(65) Prior Publication Data

US 2012/0115042 A1    May 10, 2012

Related U.S. Application Data

(62) Division of application No. 12/303,167, filed as application No. PCT/JP2007/061114 on May 31, 2007.

(30) Foreign Application Priority Data

Jun. 2, 2006    (JP) .................................. 2006-155251

(51) Int. Cl.
  *H01M 10/0567*    (2010.01)
  *H01M 6/16*    (2006.01)
  *H01M 10/0525*    (2010.01)
  *H01M 10/052*    (2010.01)
  *H01M 10/0566*    (2010.01)

(52) U.S. Cl.
  CPC .......... *H01M 10/0567* (2013.01); *H01M 6/168* (2013.01); *H01M 10/052* (2013.01); *H01M 10/0525* (2013.01); *H01M 10/0566* (2013.01); *H01M 2300/0025* (2013.01); *Y02E 60/122* (2013.01)

(58) Field of Classification Search
  CPC ..................... H01M 10/0567; H01M 10/0569; H01M 10/0525; H01M 10/052; H01M 6/14; H01M 6/168; H01M 6/164; H01M 2300/0025; Y02E 60/12; Y02E 60/122
  USPC ......... 429/199, 200, 330, 339, 340, 341, 343, 429/307; 252/62.2
  See application file for complete search history.

(56) References Cited

U.S. PATENT DOCUMENTS

| | | | |
|---|---|---|---|
| 5,561,005 | A | 10/1996 | Omaru et al. |
| 5,776,627 | A | 7/1998 | Mao et al. |
| 5,879,834 | A | 3/1999 | Mao |
| 6,033,797 | A | 3/2000 | Mao et al. |
| 6,927,001 | B1 | 8/2005 | Hamamoto et al. |
| 7,223,502 | B2 | 5/2007 | Onuki |
| 7,229,717 | B2 | 6/2007 | Yamaguchi et al. |
| 7,674,552 | B2 | 3/2010 | Nakai et al. |
| 7,981,553 | B2 | 7/2011 | Onuki |
| 2002/0192564 | A1 | 12/2002 | Ota et al. |
| 2004/0013946 | A1 | 1/2004 | Abe et al. |
| 2004/0043300 | A1* | 3/2004 | Utsugi et al. ................. 429/330 |
| 2005/0118512 | A1 | 6/2005 | Onuki et al. |
| 2006/0003232 | A1* | 1/2006 | Jung et al. .................... 429/330 |
| 2006/0068285 | A1 | 3/2006 | Yamaguchi et al. |
| 2006/0134524 | A1 | 6/2006 | Nakai et al. |
| 2006/0216612 | A1* | 9/2006 | Jambunathan et al. ........ 429/330 |
| 2006/0228626 | A1* | 10/2006 | Kawashima et al. ......... 429/200 |
| 2007/0054179 | A1* | 3/2007 | Kusachi et al. ................. 429/65 |
| 2007/0178379 | A1 | 8/2007 | Tamura et al. |
| 2007/0238025 | A1 | 10/2007 | Onuki et al. |
| 2009/0226808 | A1* | 9/2009 | Hiwara et al. ................ 429/200 |
| 2009/0253045 | A1 | 10/2009 | Kotato et al. |
| 2010/0021823 | A1 | 1/2010 | Onuki et al. |
| 2010/0035147 | A1 | 2/2010 | Kotato et al. |
| 2010/0227226 | A1 | 9/2010 | Onuki et al. |
| 2011/0159380 | A1 | 6/2011 | Onuki et al. |
| 2011/0229771 | A1 | 9/2011 | Onuki et al. |

FOREIGN PATENT DOCUMENTS

| | | |
|---|---|---|
| CN | 1277468 A | 12/2000 |
| CN | 1487621 A | 4/2004 |
| CN | 1495959 A | 5/2004 |
| CN | 1735985 A | 2/2006 |
| CN | 1770512 A | 5/2006 |
| EP | 1 258 939 A2 | 11/2002 |

(Continued)

OTHER PUBLICATIONS

Office Action issued Jun. 1, 2012 in European Application No. 11 166 645.9.
Chinese Office Action issued on Jan. 14, 2011 in corresponding Chinese Application No. 200780019964.9 (with an English Translation).
European Office Action issued on Nov. 9, 2010 in corresponding European Application No. 07 744 502.1.
Communication pursuant to Article 94(3) EPC, issued Jul. 14, 2011, in European Patent Application No. 07 744 502.1.

(Continued)

*Primary Examiner* — Laura Weiner
(74) *Attorney, Agent, or Firm* — Oblon, McClelland, Maier & Neustadt, L.L.P.

(57) ABSTRACT

Nonaqueous electrolytes which can produce a battery of high capacity and excellent storability and cycle characteristics are provided, as are batteries produced with the electrolytes. The electrolytes include ones with (i) an aromatic compound having 7-18 carbon atoms in total and a fluorinated cyclic carbonate having two or more fluorine atoms, (ii) diethyl carbonate and a fluorinated cyclic carbonate having two or more fluorine atoms, (iii) at least one of a cyclic sulfonic acid ester compound, disulfonic acid ester compound, nitrile compound, and a compound of formula (1) and a fluorinated cyclic carbonate having two or more fluorine atoms, or (iv) a nonaqueous electrolyte solution for use in a high-voltage battery having a final charge voltage of 4.3 V or higher and having a fluorinated cyclic carbonate with two or more fluorine atoms.

6 Claims, No Drawings

(56) References Cited

FOREIGN PATENT DOCUMENTS

| | | | |
|---|---|---|---|
| EP | 1 394 888 A1 | | 3/2004 |
| EP | 1 508 934 | * | 2/2005 |
| EP | 1 598 895 A1 | | 11/2005 |
| EP | 1 898 485 A1 | | 3/2008 |
| EP | 2 012 386 A1 | | 1/2009 |
| EP | 2 128 923 A1 | | 12/2009 |
| JP | 7 14607 | | 1/1995 |
| JP | 9 106835 | | 4/1997 |
| JP | 9 171840 | | 6/1997 |
| JP | 10 189039 | | 7/1998 |
| JP | 11 185806 | | 7/1999 |
| JP | 2001 43895 | | 2/2001 |
| JP | 2002-008718 | * | 1/2002 |
| JP | 2002 313415 | | 10/2002 |
| JP | 2003 31259 | | 1/2003 |
| JP | 2003-217656 | | 7/2003 |
| JP | 2003-331920 | | 11/2003 |
| JP | 2004 134261 | | 4/2004 |
| JP | 2004 179146 | | 6/2004 |
| JP | 2004-241339 A | | 8/2004 |
| JP | 2004 319317 | | 11/2004 |
| JP | 2004/363086 | | 12/2004 |
| JP | 2005 32701 | | 2/2005 |
| JP | 2005-078820 | | 3/2005 |
| JP | 2005-149750 | | 6/2005 |
| JP | 2005-209529 | | 8/2005 |
| JP | 2005-228631 | | 8/2005 |
| JP | 2008-016422 A | | 1/2008 |
| JP | 4479728 B2 | | 6/2010 |
| KR | 10-2004-0019994 A | | 3/2004 |
| WO | WO 03/077350 A1 | | 9/2003 |
| WO | WO 2005/122318 A1 | | 12/2005 |
| WO | 2006 030681 | | 3/2006 |
| WO | WO 2006/033358 A1 | | 3/2006 |
| WO | 2006054604 A1 | | 5/2006 |
| WO | WO 2007043624 | * | 4/2007 |

OTHER PUBLICATIONS

Extended European Search Report dated Jul. 21, 2011 issued in the corresponding European Patent Application No. 11166645.9, filed May 31, 2007.
Office Action issued Feb. 24, 2012 in Chinese Application No. 200780019964.9 (With English Translation).
Extended European Search Report issued Apr. 3, 2012, in Patent Application No. 12157920.5.
Office Action issued Nov. 2, 2012 in Chinese Patent Application No. 200780019964.9 (with English-language translation).
Office Action issued Feb. 28, 2013 in European Patent Application No. 12 157 920.5.
Chinese Office Action Issued May 8, 2013 in Patent Application No. 200780019964.9 (with English translation).
Extended European Search Report issued Sep. 17, 2014 in Patent Application No. 14169843.1.
M. Stanley Whittingham, "Lithium Batteries and Cathode Materials," Chemical Reviews, vol. 104, No. 10, XP055121431, Sep. 14, 2004, pp. 4271-4301.
Tsutomu Ohzuku, et al., "Layered Lithium Insertion Material of $LiCo_{1/3}Ni_{1/3}Mn_{1/3}O2$ for Lithium-Ion Batteries" Chemistry Letters 2001, Chemical Society of Japan, Japan, XP009015329, Jul. 1, 2001, pp. 642-643.
De-Cheng Li, et al., "Effect of Synthesis Method on the Electrochemical Performance of $LiN_{1/3}Mn_{1/3}CO_{1/3}O2$," Journal of Power Sources, www.elsevier.com, vol. 132, No. 1-2, XP004504610, May 20, 2004, pp. 150-155.
Kang Xu, "Nonaqueous liquid electrolytes for lithium-based rechargeable batteries" Chemical Reviews, vol. 104, No. 10, XP055139331, Sep. 16, 2004, pp. 4303-4417.
Combined Chinese Office Action and Search Report issued Sep. 10, 2014 in Patent Application No. 201110138119.1 (with English language translation and English translation of categories of cited documents).
Japanese Office Action issued on Sep. 24, 2014, in corresponding Japanese patent application 2013-021675.
Chinese Office Action issued on Nov. 20, 2014 in Chinese Patent Application No. 200780019964 with English translation.
Korean Office Action issued on Sep. 11, 2014 in Korean Patent Application No. 2014-7014631 with English translation.
Korean Office Action issued on Oct. 28, 2014 in Korean Patent Application No. 2008-7029113 with English translation.
Combined Chinese Office Action and Search Report issued Jul. 18, 2013, in Chinese Patent Application No. 201110138119.1 with English translation and English translation of category of cited documents.
Office Action issued Apr. 1, 2014 in Japanese Patent Application No. 2013-021675 (with English language translation).
Office Action issued Apr. 14, 2014 in Chinese Patent Application No. 201110138119.1 (with English language translation).
Office Action issued Apr. 29, 2014 in Korean Patent Application No. 10-2008-7029113 (with English language translation).
Office Action issued Apr. 13, 2014 in Korean Patent Application No. 2013-7034535 (with English language translation).
Chinese Office Action issued Aug. 5, 2013 in application No. 200780019964.9 w/English translation.
Korean Office Action issued Oct. 28, 2013 in application No. 2008-7029113 w/English translation.
European Office Communication issued on Jan. 2, 2014 in application No. 11166645.9-1359.
Korean Office Action issued on Oct. 29, 2014 in Korean Patent Application No. 2013-7034535 with English translation.
Office Action issued Jan. 14, 2015 for Korean Application No. 10-2014-7031670 with English Translation.
Office Action issued Jan. 15, 2015 for Korean Application No. 10-2014-7031670 with English Translation.
Office Action issued Mar. 30, 2015 in Korean Patent Application No. 10-2013-7034535 (with English language translation).
Office Action issued Mar. 9, 2015 in Chinese Patent Application No. 201110138119.1 (with English language translation).
Chinese Office Action issued on Apr. 30, 2015 in the corresponding Chinese Patent Application No. 201410001082.1 with English translation.
Korean Office Action issued Mar. 30, 2015 in corresponding Korean patent application No. 10-2014-7014631 w/English translation.
Korean Office Action issued on Aug. 24, 2015 in corresponding Korean Patent Application No. 2014-7014631 with English translation.
Notification of Reasons for Refusal issued Sep. 1, 2015, in Japanese Patent Application No. 2014-255337 filed Dec. 17, 2014 (with English translation).

\* cited by examiner

NONAQUEOUS ELECTROLYTIC SOLUTIONS AND NONAQUEOUS-ELECTROLYTE BATTERIES

CROSS REFERENCE TO RELATED APPLICATIONS

The present application is a divisional application based on U.S. Ser. No. 12/303,167, which is the national stage of international application PCT/JP2007/061114, filed on May 31, 2007, claiming the benefit of the filing date of Japanese Application No. 2006-155251, filed on Jun. 2, 2006, the text of each of which is incorporated in its entirety by reference.

TECHNICAL FIELD

The present invention relates to nonaqueous electrolytes and nonaqueous-electrolyte batteries employing the same.

BACKGROUND ART

Nonaqueous-electrolyte batteries including lithium secondary batteries are being put to practical use in extensive applications ranging from power supplies for so-called domestic use, e.g., ones for portable telephones and notebook type personal computers, to on-vehicle power supplies for driving, e.g., ones for motor vehicles. However, the recent desire for higher performances in nonaqueous-electrolyte batteries is growing more and more, and improvements in battery characteristics are required.

The electrolytes for use in nonaqueous-electrolyte batteries are usually constituted mainly of an electrolyte and a nonaqueous solvent. As main components of the nonaqueous solvent, use is being made of compounds such as cyclic carbonates, e.g., ethylene carbonate and propylene carbonate; chain carbonates, e.g., dimethyl carbonate, diethyl carbonate, and ethyl methyl carbonate; and cyclic carboxylic acid esters, e.g., γ-butyrolactone and γ-valerolactone.

Various investigations are being made on nonaqueous solvents and electrolytes in order to improve battery characteristics of such nonaqueous-electrolyte batteries, such as load characteristics, cycle characteristics, and storability.

Patent document 1 proposes the use of ethyl methyl carbonate and dimethyl carbonate in order to inhibit the deterioration in overcharge characteristics and the deterioration through standing in a high-temperature environment which are attributable to the reaction of diethyl carbonate with lithium.

Patent document 2 proposes the use of a mixture of an asymmetric chain carbonate and a cyclic carbonate having a double bond as a nonaqueous solvent. There is a statement thereinto the effect that the cyclic carbonate having a double bond reacts preferentially with the negative electrode to form a coating film of satisfactory quality on the surface of the negative electrode and this inhibits the asymmetric chain carbonate from forming a nonconductor coating film on the surface of the negative electrode, whereby storability and cycle characteristics are improved.

Patent document 3 proposes that an additive which polymerizes at a battery voltage not lower than a maximum operating voltage of a battery is incorporated into the electrolytic solution to thereby enable the battery to increase in internal resistance and thus protect the battery. Patent document 4 proposes that an additive which polymerizes at a battery voltage not lower than a maximum operating voltage of a battery to cause gas evolution and a pressure increase is incorporated into the electrolytic solution to thereby enable an internal circuit breaker disposed for protection against overcharge to work without fail. Disclosed as these additives are aromatic compounds such as biphenyl, thiophene, and furan.

Patent document 5 discloses that a lithium secondary battery having a high capacity and excellent cycle characteristics can be provided by using an electrolytic solution containing an alkylene carbonate having a fluorine group, such as cis-4,5-difluoro-1,3-dioxolan-2-one or trans-4,5-difluoro-1,3-dioxolan-2-one.

Patent Document 1: JP-A-7-14607
Patent Document 2: JP-A-21-185806
Patent Document 3: JP-A-9-106835
Patent Document 4: JP-A-9-171840
Patent Document 5: JP-A-2004-319317

DISCLOSURE OF THE INVENTION

Problems to be Solved by the Invention

However, the recent desire for higher performances in batteries is growing increasingly, and batteries are required to attain a high capacity, high-temperature storability, and cycle characteristics on a high level.

Techniques for packing an active material as much as possible into a limited battery volume in order to increase capacity are being investigated. Generally used are a method in which an active-material layer of an electrode is densified by pressing and a method in which a battery is designed so as to minimize the volume occupied by substances other than the active materials within the battery. However, to density an active-material layer of an electrode by pressing or to reduce the amount of an electrolytic solution makes it impossible to evenly use an active material. Such techniques are hence apt to pose a problem that reactions proceed unevenly to cause partial lithium deposition and accelerate active-material deterioration and sufficient characteristics are not obtained. Nonaqueous-electrolyte secondary batteries employing the electrolytes described in patent documents 1 to 5 have been still insufficient from the standpoint of reconciling cycle characteristics and high-temperature storability.

On the other hand, for the purpose of heightening energy density, an attempt is being made to charge a battery to a high voltage exceeding 4.2 V to heighten the operating voltage of the battery. However, there has been a problem that the higher the charge voltage, the more the deterioration of battery characteristics becomes remarkable.

Means for Solving the Problems

The present inventors repeatedly made investigations in order to accomplish the objects. As a result, it has been found that the problems described above can be overcome by incorporating a compound having a specific structure into a specific electrolytic solution. The invention has been thus completed.

Namely, essential points of the invention are as follows.
(1) A nonaqueous electrolyte comprising an electrolyte and a nonaqueous solvent for dissolving the electrolyte, wherein the nonaqueous electrolyte comprises a cyclic carbonate having an unsaturated bond and a fluorinated cyclic carbonate having two or more fluorine atoms.
(2) A nonaqueous electrolyte comprising an electrolyte and a nonaqueous solvent for dissolving the electrolyte, wherein the nonaqueous electrolyte comprises an aromatic compound having 7-18 carbon atoms in total and a fluorinated cyclic carbonate having two or more fluorine atoms.

(3) A nonaqueous electrolyte comprising an electrolyte and a nonaqueous solvent for dissolving the electrolyte, wherein the nonaqueous solvent comprises diethyl carbonate and a fluorinated cyclic carbonate having two or more fluorine atoms.

(4) A nonaqueous electrolyte comprising an electrolyte and a nonaqueous solvent for dissolving the electrolyte, wherein the nonaqueous electrolyte comprises: at least one compound selected from the group consisting of cyclic sulfonic acid ester compounds, di-sulfonic acid ester compounds, nitrile compounds, and compounds represented by the following general formula (1); and a fluorinated cyclic carbonate having two or more fluorine atoms:

[Ka-1]

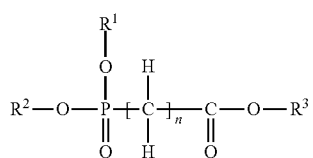

(1)

wherein $R^1$ to $R^3$ each independently represent an alkyl group which has 1-12 carbon atoms and may be substituted with a fluorine atom; and n represents an integer of 0-6.

(5) The nonaqueous electrolyte according to (1), wherein the cyclic carbonate having an unsaturated bond is at least one compound selected from the group consisting of vinylene carbonate compounds, vinylethylene carbonate compounds, and methylene-ethylene carbonate compounds.

(6) The nonaqueous electrolyte according to (1) or (5), wherein the cyclic carbonate having an unsaturated bond is at least one of vinylene carbonate and vinylethylene carbonate.

(7) The nonaqueous electrolyte according to (1), (5), or (6), wherein the proportion of the cyclic carbonate having an unsaturated bond in the nonaqueous electrolyte is from 0.001% by weight to 8% by weight.

(8) The nonaqueous electrolyte according to (2), wherein the aromatic compound has 10-18 carbon atoms in total.

(9) The nonaqueous electrolyte according to (2) or (8), wherein the aromatic compound having 7-18 carbon atoms in total is at least one compound selected from the group consisting of biphenyl, alkylbiphenyl, terphenyl, partly hydrogenated terphenyl, cyclohexylbenzene, t-butylbenzene, t-amylbenzene, diphenyl ether, and dibenzofuran.

(10) The nonaqueous electrolyte according to (2), (8), or (9), wherein the proportion of the aromatic compound having 7-18 carbon atoms in total in the nonaqueous electrolyte is from 0.001% by weight to 5% by weight.

(11) The nonaqueous electrolyte according to (3), wherein the proportion of the diethyl carbonate in the whole nonaqueous solvent is from 10% by volume to 90% by volume.

(12) The nonaqueous electrolyte according to (4), wherein the cyclic sulfonic acid ester compounds are at least one compound selected from the group consisting of 1,3-propanesultone, 1,4-butanesultone, 1,3-propenesultone, and 1,4-butenesultone.

(13) The nonaqueous electrolyte according to (4), wherein the di-sulfonic acid ester compounds are at least one compound selected from the group consisting of ethanediol disulfonate, 1,2-propanediol disulfonate, 1,3-propanediol disulfonate, 1,2-butanediol disulfonate, 1,3-butanediol disulfonate and 1,4-butanediol disulfonate.

(14) The nonaqueous electrolyte according to (4), wherein the nitrile compounds are at least one compound selected from the group consisting of acetonitrile, propinonitrile, butyronitrile, valeronitrile, crotononitrile, 3-methylcrotononitrile, malononitrile, succinonitrile, glutaronitrile, adiponitrile, and fumaronitrile.

(15) The nonaqueous electrolyte according to (4), wherein $R^1$ to $R^3$ in general formula (1) have 2-8 carbon atoms.

(16) The nonaqueous electrolyte according to (4) or (15), wherein n in general formula (1) is 0, 1, or 2.

(17) The nonaqueous electrolyte according to (4) or anyone of (12) to (16), wherein the total content of the at least one compound selected from the group consisting of cyclic sulfonic acid ester compounds, di-sulfonic acid ester compounds, nitrile compounds, and compounds represented by the general formula (1) in the nonaqueous electrolyte is from 0.001% by weight to 5% by weight.

(18) The nonaqueous electrolyte according to any one of (1) to (17), wherein the fluorinated cyclic carbonate having two or more fluorine atoms is a fluorinated ethylene carbonate having two or more fluorine atoms.

(19) The nonaqueous electrolyte according to any one of (1) to (18), wherein the fluorinated cyclic carbonate having two or more fluorine atoms is at least one compound selected from the group consisting of cis-4,5-difluoro-1,3-dioxolan-2-one, trans-4,5-difluoro-1,3-dioxolan-2-one, and 4,4-difluoro-1,3-dioxolan-2-one.

(20) The nonaqueous electrolyte according to any one of (1) to (19), wherein the proportion of the fluorinated cyclic carbonate having two or more fluorine atoms in the nonaqueous electrolyte is 0.001-10% by weight.

(21) The nonaqueous electrolyte according to any one of (1) to (20), wherein the proportion of the fluorinated cyclic carbonate having two or more fluorine atoms in the nonaqueous electrolyte is 0.01-4% by weight.

(22) A nonaqueous electrolyte comprising an electrolyte and a nonaqueous solvent for dissolving the electrolyte, wherein the nonaqueous electrolyte is an electrolyte for use in a high-voltage battery having a final charge voltage of 4.3 V or higher, and comprises a fluorinated cyclic carbonate having two or more fluorine atoms.

(23) The nonaqueous electrolyte according to (22), which comprises a cyclic carbonate having an unsaturated bond.

(24) The nonaqueous electrolyte according to (22), which comprises an aromatic compound having 7-18 carbon atoms in total.

(25) The nonaqueous electrolyte according to (22), which comprises diethyl carbonate.

(26) The nonaqueous electrolyte according to (22), which comprises at least one compound selected from the group consisting of cyclic sulfonic acid ester compounds, di-sulfonic acid ester compounds, nitrile compounds, and compounds represented by the following general formula (1):

[Ka-2]

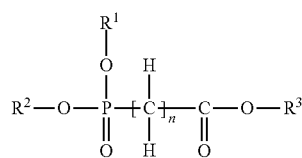

(1)

wherein $R^1$ to $R^3$ each independently represent an alkyl group which has 1-12 carbon atoms and may be substituted with a fluorine atom; and n represents an integer of 0-6.

(27) A nonaqueous-electrolyte battery comprising: a negative electrode and a positive electrode which are capable of occluding/releasing lithium ions; and a nonaqueous electrolyte, wherein the nonaqueous electrolyte is the nonaqueous electrolyte according to any one of (1) to (26).

(28) The nonaqueous-electrolyte secondary battery according to (27), wherein the negative electrode comprises at least one of carbonaceous materials and metal compounds capable of occluding and releasing lithium.

(29) The nonaqueous-electrolyte secondary battery according to (27), wherein the positive electrode comprises a lithium-transition metal composite oxide material.

Advantages of the Invention

According to the invention, nonaqueous-electrolyte batteries having a high capacity and excellent in storability and cycle characteristics can be provided. These nonaqueous-electrolyte batteries can have a smaller size and higher performances.

BEST MODE FOR CARRYING OUT THE INVENTION

Modes for carrying out the invention will be explained below in detail. However, the following explanations on constituent elements are for embodiments (typical embodiments) of the invention and should not be construed as limiting the invention.

<Nonaqueous Electrolytic Solutions>

The nonaqueous electrolytes of the invention include at least one electrolyte and a nonaqueous solvent for dissolving the electrolyte, like common nonaqueous electrolytes. Usually, the electrolyte and the nonaqueous solvent are major components of the electrolytes.

(Electrolyte)

One or more lithium salts are usually used as the electrolyte. As the lithium salts, any desired lithium salts known to be usable in this application can be used without particular limitations. Examples thereof include the following.

Examples of the lithium salts include inorganic lithium salts such as $LiPF_6$ and $LiBF_4$; fluorine-containing organic lithium salts such as $LiCF_3SO_3$, $LiN(CF_3SO_2)_2$, $LiN(C_2F_5SO_2)_2$, lithium salt of cyclic 1,2-perfluoroethanedisulfonylimide, lithium salt of cyclic 1,3-perfluoropropanedisulfonylimide, $(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2/LiPF_4(C_2F_5SO_2)_2/LiBF_2(CF_3)_2$, $LiBF_2(C_2F_5)_2$, $LiBF_2(CF_3SO_2)_2$, and $LiBF_2(C_2F_5SO_2)_2$; and lithium bis(oxalate)borate.

Of these, $LiPF_6$, $LiBF_4$, $LiCF_3SO_3$, $LiN(CF_3SO_2)_2$/or $LiN(C_2F_5SO_2)_2$ is preferred from the standpoint of battery performance improvement. Especially preferred is $LiPF_6$ or $LiBF_4$.

These lithium salts may be used alone or in combination of two or more thereof.

In the case where two or more lithium salts are used in combination, a preferred example is a combination of $LiPF_6$ and $LiBF_4$. This combination has the effect of improving cycle characteristics. In this case, the proportion of $LiBF_4$ in the sum of both is preferably 0.01% by weight or higher, especially preferably 0.1% by weight or higher, and is preferably 20% by weight or lower, especially preferably 5% by weight or lower, When the proportion of $LiBF_4$ is lower than the lower limit, there are cases where the desired effect is difficult to obtain. When the proportion thereof exceeds the upper limit, there are cases where battery characteristics decrease through high-temperature storage.

Another example is a combination of an inorganic lithium salt and a fluorine-containing organic lithium salt. In this case, the proportion of the inorganic lithium salt in the sum of both desirably is 70% by weight or higher and 99% by weight or lower. The fluorine-containing organic lithium, salt preferably is any of $LiN(CF_3SO_2)_2$, $LiN(C_2F_5SO_2)_2$, lithium salt of cyclic 1,2-perfluoroethanedisulfonylimide, and lithium salt of cyclic 1,3-perfluoropropanedisulfonylimide. This combination has the effect of inhibiting the deterioration caused by high-temperature storage.

When the nonaqueous solvent is one containing γ-butyrolactone in an amount of 55% by volume or larger, the lithium salts preferably are either $LiBF_4$ or a combination of $LiBF_4$ and one or more other lithium salts. In this case, it is preferred that $LiBF_4$ accounts for at least 40% by mole of all lithium salts. An especially preferred combination is one in which the proportion of $LiBF_4$ in all lithium salts is 40% by mole or higher and 95% by mole or lower and the remainder is one or more members selected from the group consisting of $LiPF_6$, $LiCF_3SO_3$, $LiN(CF_3SO_2)_2$, and $LiN(C_2F_5SO_2)_2$.

The concentration of these electrolytes in the nonaqueous electrolyte is not particularly limited from the standpoint of producing the effects of the invention. However, the concentration thereof is generally 0.5 mol/L or higher, preferably 0.6 mol/L or higher, more preferably 0.7 mol/L or higher. The upper limit thereof is generally 3 mol/L or lower, preferably 2 mol/L or lower, more preferably 1.8 mol/L or lower, even more preferably 1.5 mol/L or lower. When the concentration thereof is too low, there are cases where the electrolytic solution has insufficient electrical conductivity. On the other hand, when the concentration thereof is too high, there are cases where the resultant increase in viscosity lowers electrical conductivity or reduces battery performances.

(Nonaqueous Solvent)

The nonaqueous solvent to be use may also be one suitably selected from nonaqueous solvents which have been known as solvents for nonaqueous electrolytes. Examples thereof include cyclic carbonates having no unsaturated bond, chain carbonates, cyclic ethers, chain ethers, cyclic carboxylic acid esters, chain carboxylic acid esters, and phosphorus-containing organic solvents.

Examples of the cyclic carbonates having no carbon-carbon unsaturated bond include alkylene carbonates having an alkylene group with 2-4 carbon atoms, such as ethylene carbonate, propylene carbonate, and butylene carbonate. Of these, ethylene carbonate and propylene carbonate are preferred from the standpoint of improving battery characteristics. Especially preferred is ethylene carbonate.

The chain carbonates preferably are dialkyl carbonates, in which the constituent alkyl groups each have preferably 1-5 carbon atoms, especially preferably 1-4 carbon atoms. Examples thereof include dialkyl carbonates such as symmetric chain alkyl carbonates, e.g., dimethyl carbonate, diethyl carbonate, and di-n-propyl carbonate, and asymmetric chain alkyl carbonates, e.g., ethyl methyl carbonate, methyl n-propyl carbonate, and ethyl n-propyl carbonate. Preferred of these from the standpoint of battery characteristics (in particular, high-load discharge characteristics) are dimethyl carbonate, diethyl carbonate, and ethyl methyl carbonate.

Examples of the cyclic ethers include tetrahydrofuran and 2-methyltetrandyrofuran.

Examples of the chain ethers include dimethoxyethane and dimethoxymethane.

Examples of the cyclic carboxylic acid esters include γ-butyrolactone and γ-valerolactone.

Examples of the chain carboxylic acid esters include methyl acetate, methyl propionate, ethyl propionate, and methyl butyrate.

Examples of the phosphorus-containing organic solvents include trimethyl phosphate, triethyl phosphate, dimethyl ethyl phosphate, methyl diethyl phosphate, ethylene-methyl phosphate, and ethylene-ethyl phosphate.

These compounds may be used alone or in combination of two or more thereof. However, it is preferred to use two or more compounds in combination. For example, it is preferred to use a combination of a high-permittivity solvent, e.g., an alkylene carbonate or cyclic carboxylic acid ester, and a low-viscosity solvent, e.g., a dialkyl carbonate or chain carboxylic acid ester.

One preferred example of combinations for use as a nonaqueous solvent is combinations consisting mainly of at least one alkylene carbonate and at least one dialkyl carbonate. Especially preferred is a combination in which the proportion of the sum of the alkylene carbonate and the dialkyl carbonate in the whole nonaqueous solvent is 70% by volume or higher, preferably 80% by volume or higher, more preferably 90% by volume or higher, and the proportion of the alkylene carbonate to the sum of the alkylene carbonate and the dialkyl carbonate is 5% or higher, preferably 10% or higher, more preferably 15% or higher, and is generally 50% or lower, preferably 35% or lower, more preferably 30% or lower, even more preferably 25% lower. Use of this combination as a nonaqueous solvent is preferred because the battery produced with this solvent combination has a satisfactory balance between cycle characteristics and high-temperature storability (in particular, residual capacity and high-load discharge capacity after high-temperature storage).

Preferred examples of the combination of at least one alkylene carbonate and at least one dialkyl carbonate include: ethylene carbonate and dimethyl carbonate; ethylene carbonate and diethyl carbonate; ethylene carbonate and ethyl methyl carbonate; ethylene carbonate, dimethyl carbonate, and diethyl carbonate; ethylene carbonate, dimethyl carbonate, and ethyl methyl carbonate; ethylene carbonate, diethyl carbonate, and ethyl methyl carbonate; and ethylene carbonate, dimethyl carbonate, diethyl carbonate, and ethyl methyl carbonate.

Preferred combination examples further include those combinations of ethylene carbonate and one or more dialkyl carbonates to which propylene carbonate has been further added.

In the case where propylene carbonate is contained, the ethylene carbonate/propylene carbonate volume ratio is preferably from 99:1 to 40:60, especially preferably from 95:5 to 50:50. The proportion of propylene carbonate in the whole nonaqueous solvent is generally 0.1% by volume or higher, preferably 1% by volume or higher, more preferably 2% by volume or higher, and the upper limit thereof is generally 20% by volume or lower, preferably 8% by volume or lower, more preferably 5% by volume or lower. This combination containing propylene carbonate in a concentration within that range is preferred because it has excellent low-temperature properties while retaining the properties of the combination of ethylene carbonate and one or more dialkyl carbonates.

More preferred of the combinations of ethylene carbonate and one or more dialkyl carbonates are ones in which the dialkyl carbonates include one or more asymmetric chain alkyl carbonates. In particular, a combination composed of ethylene carbonate, one or more symmetric chain alkyl carbonates, and one or more asymmetric chain alkyl carbonates is preferred because it brings about a satisfactory balance between cycle characteristics and high-current discharge characteristics. Examples of this combination include: ethylene carbonate, dimethyl carbonate, and ethyl methyl carbonate; ethylene carbonate, diethyl carbonate, and ethyl methyl carbonate; and ethylene carbonate, dimethyl carbonate, diethyl carbonate, and ethyl methyl carbonate. Preferred of such combinations are ones in which the asymmetric chain alkyl carbonates include ethyl methyl carbonate and each alkyl group of the alkyl carbonates has 1-2 carbon atoms.

The proportion of dimethyl carbonate in the whole nonaqueous solvent may be generally 10% by volume or higher, preferably 20% by volume or higher, more preferably 25% by volume or higher, even more preferably 30% by volume or higher, and the upper limit thereof may be generally 90% by volume or lower, preferably 80% by volume or lower, more preferably 75% by volume or lower, even more preferably 70% by volume or lower. Use of the nonaqueous solvent containing dimethyl carbonate in an amount within such range is preferred because it gives a battery having improved load characteristics.

The proportion of ethyl methyl carbonate in the whole nonaqueous solvent may be generally 10% by volume or higher, preferably 20% by volume or higher, more preferably 25% by volume or higher, even more preferably 30% by volume or higher, and the upper limit thereof may be generally 90% by volume or lower, preferably 80% by volume or lower, more preferably 75% by volume or lower, even more preferably 70% by volume or lower. Use of the nonaqueous solvent containing ethyl methyl carbonate in an amount within such range is preferred because it gives a battery having a satisfactory balance between cycle characteristics and storability.

Other solvents may be incorporated into the combinations consisting mainly of at least one alkylene carbonate and at least one dialkyl carbonate described above. Although the additional solvents are not particularly limited from the standpoint of producing the effects of the invention, it is preferred not to incorporate a cyclic carboxylic acid ester when load characteristics are important.

Another preferred example of the nonaqueous solvent is one at least 60% by volume of which is accounted for by at least one organic solvent selected from the group consisting of ethylene carbonate, propylene carbonate, γ-butyrolactone, and γ-valerolactone or by a mixed solvent composed of two or more organic solvents selected from that group. The nonaqueous electrolyte employing this mixed solvent is less apt to suffer solvent vaporization or liquid leakage even when used at high temperatures. In particular, when a nonaqueous solvent in which the proportion of the sum of ethylene carbonate and γ-butyrolactone is preferably 80% by volume or higher, more preferably 90% by volume or higher, and the ethylene carbonate/γ-butyrolactone volume ratio is from 5:95 to 45:55 is used or when a nonaqueous solvent in which the proportion of the sum of ethylene carbonate and propylene carbonate is preferably 80% by volume or higher, more preferably 90% by volume or higher, and the ethylene carbonate/propylene carbonate volume ratio is from 30:70 to 60:40 is used, then a better balance among cycle characteristics, high-temperature storability, etc. is obtained.

In this description, component volumes in the nonaqueous solvent are values measured at 25° C. However, in the case of components which are solid at 25° C., such as ethylene carbonate, values measured at the melting points are used.

(Fluorinated Cyclic Carbonate Having Two or More Fluorine Atoms)

The nonaqueous electrolytes according to the invention, which include the electrolyte and nonaqueous solvent described above, further contain at least one fluorinated cyclic carbonate having two or more fluorine atoms.

The number of the fluorine atoms of the fluorinated cyclic carbonate having two or more fluorine atoms is not particularly limited. In the case of fluorinated ethylene carbonates, however, the lower limit of the number thereof is generally 2 or larger and the upper limit thereof is generally 4 or smaller, preferably 3 or smaller.

In the case of fluorinated propylene carbonates, the lower limit of the number of the fluorine atoms is generally 2 or larger and the upper limit thereof is generally 6 or smaller, preferably 5 or smaller. In particular, one having two or more fluorine atoms each bonded to any of the carbon atoms constituting a ring structure is preferred from the standpoint of improving cycle characteristics and storability.

Examples of the fluorinated cyclic carbonate having two or more fluorine atoms include fluorinated ethylene carbonates such as cis-4,5-difluoro-1,3-dioxolan-2-one, trans-4,5-difluoro-1,3-dioxolan-2-one, 4,4-difluoro-1,3-dioxolan-2-one, trifluoro-1,3-dioxolan-2-one, and tetrafluoro-1,3-dioxolan-2-one and fluorinated propylene carbonates such as 4,5-difluoro-4-methyl-1,3-dioxolan-2-one, 4,4-difluoro-5-methyl-1,3-dioxolan-2-one, 4,4,5-trifluoro-5-methyl-1,3-dioxolan-2-one, and 4,5-difluoro-4-trifluoromethyl-1,3-dioxolan-2-one. Preferred of these from the standpoint of improving battery characteristics are the fluorinated ethylene carbonates having two or more fluorine atoms. Especially preferred of these are cis-4,5-difluoro-1,3-dioxolan-2-one, trans-4,5-difluoro-1,3-dioxolan-2-one, and 4,4-difluoro-1,3-dioxolan-2-one.

Such fluorinated cyclic carbonates having two or more fluorine atoms may be used alone or in combination of two or more thereof. The proportion of the fluorinated cyclic carbonates having two or more fluorine atoms in each nonaqueous electrolyte is not particularly limited from the standpoint of producing the effects of the invention. However, the proportion thereof is generally 0.001% by weight or higher, preferably 0.01% by weight or higher, more preferably 0.1% by weight or higher, especially preferably 0.2% by weight or higher, most preferably 0.25% by weight or higher. When the Concentration thereof is lower than that, there are cases where the effects of the invention are difficult to produce. Conversely, too high concentrations thereof may result in cases where the battery undergoes enhanced swelling during high-temperature storage. Because of this, the upper limit of the proportion of the fluorinated cyclic carbonates is generally 10% by weight or lower, preferably 4% by weight or lower, more preferably 2% by weight or lower, especially preferably 1% by weight or lower, most preferably 0.5% by weight or lower.

One aspect of the invention is a nonaqueous electrolyte which includes at least one electrolyte and a nonaqueous solvent for dissolving the electrolyte, and is characterized by containing at least one cyclic carbonate having an unsaturated bond and further containing at least one fluorinated cyclic carbonate having two or more fluorine atoms.

Examples of the cyclic carbonate having an unsaturated bond include vinylene carbonate compounds such as vinylene carbonate, methylvinylene carbonate, ethylvinylene carbonate, 4,5-dimethylvinylene carbonate, 4,5-diethylvinylene carbonate, and fluorovinylene carbonate; vinylethylene carbonate compounds such as vinylethylene carbonate, 4-methyl-4-vinylethylene carbonate, 4-ethyl-4-vinylethylene carbonate, 4-n-propyl-4-vinylethylene carbonate, 5-methyl-4-vinylethylene carbonate, 4,4-divinylethylene carbonate, and 4,5-divinylethylene carbonate; and methylene-ethylene carbonates such as 4,4-dimethyl-5-methylene-ethylene carbonate and 4,4-diethyl-5-methylene-ethylene carbonate.

Of these, vinylene carbonate, vinylethylene carbonate, 4-methyl-4-vinylethylene carbonate, or 4,5-divinylethylene carbonate is preferred from the standpoint of improving cycle characteristics. More preferred of these is vinylene carbonate or vinylethylene carbonate. Those compounds may be used alone or in combination of two or more thereof.

In the case where two or more compounds are used in combination, it is preferred to use a combination of vinylene carbonate and vinylethylene carbonate.

The proportion of the cyclic carbonate having an unsaturated bond in this nonaqueous electrolyte is not particularly limited from the standpoint of producing the effects of the invention. However, the proportion thereof is generally 0.001% by weight or higher, preferably 0.1% by weight or higher, especially preferably 0.3% by weight or higher, most preferably 0.5% by weight or higher. When the content of the cyclic carbonate having an unsaturated bond in the molecule is too low, there are cases where the effect of improving battery cycle characteristics cannot be sufficiently produced. However, in case where the content of the cyclic carbonate having an unsaturated bond is too high, there is a tendency that gas evolution during high-temperature storage is enhanced or low-temperature discharge characteristics decrease. Because of this, the upper limit of the proportion of this cyclic carbonate is generally 8% by weight or lower, preferably 4% by weight or lower, especially preferably 3% by weight or lower.

The reasons why this nonaqueous electrolyte according to the invention improves high-temperature storability and cycle characteristics have not been elucidated. However, the improvement is presumed to be attained by the following mechanism, although the invention should not be construed as being limited by the following mechanism.

First, the cyclic carbonate having an unsaturated bond, e.g., vinylene carbonate, is reduced during initial charge to form a stable coating film containing a polymeric ingredient on the surface of the negative electrode. As a result, storability and cycle characteristics can be improved. However, the cyclic carbonate having an unsaturated bond is apt to react with the positive-electrode material in a charged state. There has been a problem that the reaction with the positive-electrode material proceeds especially in a high-temperature atmosphere to accelerate deterioration of the positive-electrode active material, resulting in reduced battery characteristics or enhanced gas evolution. In contrast, when the nonaqueous electrolyte contains a fluorinated cyclic carbonate having two or more fluorine atoms, then this fluorinated cyclic carbonate having two or more fluorine atoms and the cyclic carbonate having an unsaturated bond form a composite coating film on the surface of the negative electrode through reduction reactions. In this stage, part of the product of reduction of the fluorinated cyclic carbonate having two or more fluorine atoms moves to the surface of the positive electrode to form a coating film on the surface of the positive electrode. This coating film prevents the positive electrode from coming into contact with the cyclic carbonate having an unsaturated bond. It is thought that the cyclic carbonate having an unsaturated bond can be thus inhibited from undergoing a side reaction with the positive-electrode material.

Furthermore, the fluorinate cyclic carbonate having two or more fluorine atoms is more apt to undergo reduction reaction than fluorinated cyclic carbonates having less than two fluorine atoms. The former cyclic carbonate hence has the high ability to form a coating film on the negative electrode and the high ability to protect the positive electrode, and can inhibit side reactions from occurring in the battery.

In case where the cyclic carbonate having an unsaturated bond is not contained, a coating film consisting mainly of a product of reductional decomposition of the fluorinated cyclic carbonate having two or more fluorine atoms is formed on the surface of the negative electrode. However, compared to this coating film, the composite coating film formed from both the cyclic carbonate having an unsaturated bond and the fluorinated cyclic carbonate having two or more fluorine atoms contains a larger amount of a polymeric ingredient and has better stability. The negative electrode is thought to be thus inhibited from undergoing side reactions with other components of the electrolytic solution.

As described above, improvements in high-temperature storability and cycle characteristics can be attained by the interaction between the cyclic carbonate having an unsaturated bond and the fluorinated cyclic carbonate having two or more fluorine atoms.

Another aspect of the invention is a nonaqueous electrolyte which includes at least one electrolyte and a nonaqueous solvent for dissolving the electrolyte, and is characterized by containing at least one aromatic compound having 7-18 carbon atoms in total and further containing at least one fluorinated cyclic carbonate having two or more fluorine atoms.

The lower limit of the number of the carbon atoms of the aromatic compound having 7-18 carbon atoms is generally 7 or larger, preferably 8 or larger, more preferably 10 or larger. The lower limit thereof is generally 18 or smaller.

When the number thereof is larger than the lower limit, satisfactory overcharge-preventive properties are obtained. When the number thereof is smaller than the upper limit, this aromatic compound has satisfactory solubility in the electrolytic solution.

Examples of the aromatic compound having 7-18 carbon atoms in total include aromatic compounds such as biphenyl, alkylbiphenyls such as 2-methylbiphenyl, terphenyl, partly hydrogenated terphenyls, cyclopentylbenzene, cyclohexylbenzene, t-butylbenzene, t-amylbenzene, diphenyl ether, and dibexizofuran; products of the partial fluorination of these aromatic compounds, such as 2-fluorobiphenyl, 3-fluorobiphenyl, 4-fluorobiphenyl, o-cyclohexylfluorobenzene, and p-cyclohexylfluorobenzene; and fluorine-containing anisole compounds such as 2,4-difluoroanisole, 2,5-difluoroanisole, 2,6-difluoroanisole, and 3,5-difluoroanisole.

Preferred of these are aromatic compounds such as biphenyl, alkylbiphenyls, terphenyl, partly hydrogenated terphenyls, cyclohexylbenzene, t-butylbenzene, t-amylbenzene, diphenyl ether, and dibenzofuran.

Two or more of these compounds may be used in combination. In the case of using two or more compounds in combination, the following combinations are especially preferred from the standpoint of a balance between overcharge-preventive properties and high-temperature storability: a combination of cyclohexylbenzene and either t-butylbenzene or t-amylbenzene; and a combination of one or more members selected from aromatic compounds containing no oxygen, such as biphenyl, alkylbiphenyls, terphenyl, partly hydrogenated terphenyls, cyclohexylbenzene, t-butylbenzene, and t-amylbenzene, and one or more members selected from oxygen-containing aromatic compounds such as diphenyl ether and dibenzofuran.

The reasons why this nonaqueous electrolyte according to the invention is excellent in safety in overcharge and improves high-temperature storability and cycle characteristics have not been elucidated. However, these effects are presumed to be attained by the following mechanism, although the invention should not be construed as being limited by the following mechanism.

In general, aromatic compounds each having 7-18 carbon atoms in total have the effect of improving safety in overcharge. However, these compounds are more apt to react on the positive electrode and negative electrode than solvent ingredients. Because of this, the compounds undesirably react at highly active sites on the electrodes even during high-temperature storage. The reaction of these compounds considerably increases the internal resistance of the battery and evolves a gas, and this has been a cause of a considerable decrease in discharge characteristics after high-temperature storage. It is thought that when the electrolytic solution containing a fluorinated cyclic carbonate having two or more fluorine atoms is used, then a coating film of a reduction reaction product derived from the fluorinated cyclic carbonate having two or more fluorine atoms is efficiently formed on the surface of the negative electrode from initial charge and this coating film inhibits the negative electrode from reacting with the aromatic compound having 7-18 carbon atoms in total. Furthermore, part of the product of reduction of the fluorinated cyclic carbonate having two or more fluorine atoms moves to the surface of the positive electrode to form a coating film on the surface of the positive electrode. This coating film prevents the positive electrode from coming into contact with the aromatic compound having 7-18 carbon atoms in total. It is thought that the aromatic compound having 7-18 carbon atoms in total can be thus inhibited from undergoing a side reaction with the positive-electrode material.

It is thought that by thus inhibiting the aromatic compound having 7-18 carbon atoms in total from undergoing a side reaction with the negative electrode and positive electrode, discharge characteristics are inhibited from considerably decreasing through high-temperature storage.

The proportion of the aromatic compound having 7-18 carbon atoms in total in the nonaqueous electrolyte is not particularly limited from the standpoint of producing the effects of the invention. However, the proportion thereof is generally 0.001% by weight or higher, preferably 0.1% by weight or higher, especially preferably 0.3% by weight or higher, most preferably 0.5% by weight or higher. The upper limit thereof is generally 5% by weight or lower, preferably 3% by weight or lower, especially preferably 2% by weight or lower. When the concentration of the aromatic compound is lower than that lower limit, there are cases where the effect of improving safety in overcharge is difficult to produce. Conversely, too high concentrations thereof may result in cases where battery characteristics including high-temperature storability decrease.

Still another aspect of the invention is a nonaqueous electrolyte which includes at least one electrolyte and a nonaqueous solvent for dissolving the electrolyte, and is characterized in that the nonaqueous solvent contains diethyl carbonate and further contains at least one fluorinated cyclic carbonate having two or more fluorine atoms.

The proportion of the diethyl carbonate in the whole nonaqueous solvent is not particularly limited from the standpoint of producing the effects of the invention. However, the proportion thereof is generally 10% by volume or higher, preferably 20% by volume or higher, more preferably 25% by volume or higher, even more preferably 30% by volume or higher. The upper limit thereof is generally 90% by volume or lower, preferably 80% by volume or lower, more preferably 75% by volume or lower, even more preferably 70% by volume or lower. The incorporation of diethyl carbonate in an amount within that range is preferred because this inhibits battery swelling during high-temperature storage.

The reasons why this nonaqueous electrolyte according to the invention improves high-temperature storability and cycle characteristics while inhibiting battery swelling during high-temperature storage have not been elucidated. However, these effects are presumed to be attained by the following mechanism, although the invention should not be construed as being limited by the following mechanism.

Diethyl carbonate has a higher boiling point than dimethyl carbonate and ethyl methyl carbonate, and does not generate methane gas even when decomposed. Diethyl carbonate is hence a preferred solvent from the standpoint of inhibiting battery swelling during high-temperature storage. However, diethyl carbonate tends more to react with lithium than dimethyl carbonate and ethyl methyl carbonate. Especially in batteries in which lithium deposition is apt to occur due to an increased density, the reaction with the deposited lithium has been a case of a decrease in battery characteristics. It is thought that when the electrolytic solution containing a fluorinated cyclic carbonate having two or more fluorine atoms is used, then a coating film of a reduction reaction product derived from the fluorinated cyclic carbonate having two or more fluorine atoms is efficiently formed on the surface of the negative electrode from initial charge and part of the reduction product of that compound moves to the surface of the positive electrode to form a coating film on the surface of the positive electrode. These coating films inhibit the negative electrode and positive electrode from undergoing side reactions with other components of the electrolytic solution. It is thought that the active materials are therefore used evenly and lithium deposition can be inhibited to thereby produce those effects. Furthermore, it is thought that even when lithium deposition has occurred, the fluorinated cyclic carbonate having two or more fluorine atoms forms a coating film on the surface of the lithium to inhibit the lithium from reacting with the diethyl carbonate and thereby produce those effects.

A further aspect of the invention is a nonaqueous electrolyte which includes at least one electrolyte and a nonaqueous solvent for dissolving the electrolyte, and is characterized by containing at least one compound selected from the group consisting of cyclic sulfonic acid ester compounds, di-sulfonic acid ester compounds, nitrile compounds, and compounds represented by the following general formula (1), and by further containing at least one fluorinated cyclic carbonate having two or more fluorine atoms:

[Ka-3]

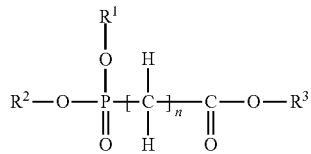

(1)

(wherein $R^1$ to $R^3$ each independently represent an alkyl group having 1-12 carbon atoms and optionally substituted with one or more fluorine atoms; and n represents an integer of 0-6).

[Cyclic Sulfonic Acid Ester Compounds]

The cyclic sulfonic acid ester compounds are not particularly limited in their kinds so long as they are compounds having a cyclic structure part of which is a sulfonic acid ester structure. Examples of the cyclic sulfonic acid ester compounds include 1,3-propanesultone, 1,4-butanesultone, 1,3-propenesultone, 1,4-butenesultone, 1-methyl-1,3-propanesultone, 3-methyl-1,3-propanesultone, 1-fluoro-1,3-propanesultone, and 3-fluoro-1,3-propanesultone.

Of these, 1,3-propanesultone, 1,4-butanesultone, 1,3-propenesultone, and 1,4-butenesultone are preferred from the standpoint of improving storability. More preferred of these are 1,3-propanesultone and 1,3-propenesultone.

[Di-Sulfonic Acid Ester Compounds]

The di-sulfonic acid ester compounds are not particularly limited in their kinds so long as they are compounds having two sulfonic acid ester structures in the molecule. Examples of the di-sulfonic acid ester compounds include ethanediol disulfonates such as ethanediol dimethanesulfonate, ethanediol diethanesulfonate, ethanediol dipropanesulfonate, ethanediol dibutanesulfonate, ethanedial bis(trifluoromethanesulfonate), ethanediol bis(pentafluoroethanesulfonate), ethanediol bis(heptafluoropropanesulfonate), ethanediol bis(perfluorobutanesulfonate), ethanediol di(fluoromethanesulfonate), ethanediol bis(difluoromethanesulfonate), ethanediol di(2-fluoroethanesulfonate), ethanediol bis(1,1-difluoroethanesulfonate), ethanediol bis(1,2-difluoroethanesulfonate), ethanediol bis(2,2-difluoroethanesulfonate), ethanediol bis(1,1,2-trifluoroethanesulfonate), ethanediol bis(1,2,2-trifluoroethanesulfonate), ethanediol bis(2,2,2-trifluoroethanesulfonate), ethanediol bis(1,1,2,2-tetrafluoroethanesulfonate), and ethanediol bis(1,2,2,2-tetrafluoroethanesulfonate);

1,2-propanediol disulfonates such as 1,2-propanediol dimethanesulfonate, 1,2-propanediol diethanesulfonate, 1,2-propanediol dipropanesulfonate, 1,2-propanediol dibutanesulfonate, 1,2-propanediol bis(trifluoromethanesulfonate), 1,2-propanediol bis(pentafluoroethanesulfonate), 1,2-propanediol bis(heptafluoropropanesulfonate), 1,2-propanediol bis(perfluorobutanesulfonate), 1,2-propanediol di(fluoromethanesulfonate), 1,2-propanediol bis(difluoromethanesulfonate), 1,2-propanediol di(2-fluoroethanesulfonate), 1,2-propanediol bis(1,1-difluoroethanesulfonate), 1,2-propanediol bis(1,2-difluoroethanesulfonate), 1,2-propanediol bis(2,2-difluoroethanesulfonate), 1,2-propanediol bis(1,1,2-trifluoroethanesulfonate), 1,2-propanediol bis(1,2,2-trifluoroethanesulfonate), 1,2-propanediol bis(2,2,2-trifluoroethanesulfonate), 1,2-propanediol bis(1,1,2,2-tetrafluoroethanesulfonate), and 1,2-propanediol bis(1,2,2,2-tetrafluoroethanesulfonate);

1,3-propanediol disulfonates such as 1,3-propanediol dimethanesulfonate, 1,3-propanediol diethanesulfonate, 1,3-propanediol dipropanesulfonate, 1,3-propanediol dibutanesulfonate, 1,3-propanediol bis(trifluoromethanesulfonate), 1,3-propanediol bis(pentafluoroethanesulfonate), 1,3-propanediol bis(heptafluoropropanesulfonate), 1,3-propanediol bis(perfluorobutanesulfonate), 1,3-propanediol di(fluoromethanesulfonate), 1,3-propanediol bis(difluoromethanesulfonate), 1,3-propanediol di(2-fluoroethanesulfonate), 1,3-propanediol bis(1,1-difluoroethanesulfonate), 1,3-propanediol bis(1,2-difluoroethanesulfonate), 1,3-propanediol bis(2,2-difluoroethanesulfonate), 1,3-propanediol bis(1,1,2-trifluoroethanesulfonate), 1,3-propanediol bis(1,2,2-trifluoroethanesulfonate), 1,3-propanediol bis(2,2,2-trifluoroethanesulfonate), 1,3-propanediol bis(1,1,2,2-tetrafluoroethanesulfonate), and 1,3-propanediol bis(1,2,2,2-tetrafluoroethanesulfonate); 1,2-butanediol disulfonates such as 1,2-butanediol dimethanesulfonate, 1,2-butanediol diethanesulfonate, 1,2-butanediol bis(trifluoromethanesulfonate), 1,2-butanediol bis(pentafluoroethanesulfonate), 1,2-butanediol bis(heptafluoropropanesulfonate), 1,2-butanediol bis(perfluorobutanesulfonate), 1,2-butanediol di(fluoromethanesulfonate), 1,2-butanediol bis(difluoromethanesulfonate), 1,2-butanediol di(2-fluoroethanesulfonate), 1,2-butanediol bis(2,2-difluoroethanesulfonate), and 1,2-butanediol bis(2,2,2-trifluoroethanesulfonate);

1,3-butanediol disulfonates such as 1,3-butanediol dimethanesulfonate, 1,3-butanediol diethanesulfonate, 1,3-butanediol bis(trifluoromethanesulfonate), 1,3-butanediol bis(pentafluoroethanesulfonate), 1,3-butanediol bis(heptafluoropropanesulfonate), 1,3-butanediol bis(perfluorobutanesulfonate), 1,3-butanediol di(fluoromethanesulfonate), 1,3-butanediol bis(difluoromethanesulfonate), 1,3-butanediol di(2-fluoroethanesulfonate), 1,3-butanediol bis(2,2-difluoroethanesulfonate), and 1,3-butanediol bis(2,2,2-trifluoroethanesulfonate); and 1,4-butanediol disulfonates such as 1,4-butanediol dimethanesulfonate, 1,4-butanediol diethanesulfonate, 1,4-butanediol dipropanesulfonate, 1,4-butanediol dibutanesulfonate, 1,4-butanediol bis(trifluoromethanesulfonate), 1,4-butanediol bis(pentafluoroethanesulfonate), 1,4-butanediol bis(heptafluoropropanesulfonate), 1,4-butanediol bis(perfluorobutanesulfonate), 1,4-butanediol di(fluoromethanesulfonate), 1,4-butanediol bis(difluoromethanesulfonate), 1,4-butanediol di(2-fluoroethanesulfonate), 1,4-butanediol bis(1,1-difluoroethanesulfonate), 1,4-butanediol bis(1,2-difluoroethanesulfonate), 1,4-butanediol bis(2,2-difluoroethanesulfonate), 1,4-butanediol bis(1,1,2-trifluoroethanesulfonate), 1,4-butanediol his(1,2,2-trifluoroethanesulfonate), 1,4-butanediol bis(2,2,2-trifluoroethanesulfonate), 1,4-butanediol bis(1,1,2,2-tetrafluoroethanesulfonate), and 1,4-butanediol bis(1,2,2,2-tetrafluoroethanesulfonate).

Preferred of these from the standpoint of improving storability are: ethanediol disulfonates such as ethanediol dimethanesulfonate, ethanediol diethanesulfonate, ethanediol bis(trifluoromethanesulfonate), ethanediol bis(pentafluoroethanesulfonate), ethanediol di(fluoromethanesulfonate), ethanediol bis(difluoromethanesulfonate), ethanediol di(2-fluoroethanesulfonate)(ethanediol bis(2,2-difluoroethanesulfonate), and ethanediol bis(2,2,2-trifluoroethanesulfonate); 1,2-propanediol disulfonates such as 1,2-propanediol dimethanesulfonate, 1,2-propanediol diethanesulfonate, 1,2-propanediol bis(trifluoromethanesulfonate), 1,2-propanediol bis(pentafluoroethanesulfonate), 1,2-propanediol di(fluoromethanesulfonate), 1,2-propanediol bis(difluoromethanesulfonate), 1,2-propanediol di(2-fluoroethanesulfonate), 1,2-propanediol bis(2,2-difluoroethanesulfonate), and 1,2-propanediol bis(2,2,2-trifluoroethanesulfonate);

1,3-propanediol disulfonates such as 1,3-propanediol dimethanesulfonate, 1,3-propanediol diethanesulfonate, 1,3-propanediol bis(trifluoromethanesulfonate), 1,3-propanediol bis(pentafluoroethanesulfonate), 1,3-propanediol di(fluoromethanesulfonate), 1,3-propanediol bis(difluoromethanesulfonate), 1,3-propanediol di(2-fluoroethanesulfonate), 1,3-propanediol bis(2,2-difluoroethanesulfonate), and 1,3-propanediol bis(2,2,2-trifluoroethanesulfonate); 1,2-butanediol disulfonates such as 1,2-butanediol dimethanesulfonate, 1,2-butanediol diethanesulfonate, 1,2-butanediol bis(trifluoromethanesulfonate), 1,2-butanediol bis(pentafluoroethanesulfonate), 1,2-butanediol di(fluoromethanesulfonate), 1,2-butanediol bis(difluoromethanesulfonate), 1,2-butanediol di(2-fluoroethanesulfonate), 1,2-butanediol bis(2,2-difluoroethanesulfonate), and 1,2-butanediol bis(2,2,2-trifluoroethanesulfonate);

1,3-butanediol disulfonates such as 1,3-butanediol dimethanesulfonate, 1,3-butanediol diethanesulfonate, 1,3-butanediol bis(trifluoromethanesulfonate), 1,3-butanediol bis(pentafluoroethanesulfonate), 1,3-butanediol di(fluoromethanesulfonate), 1,3-butanediol bis(difluoromethanesulfonate), 1,3-butanediol di(2-fluoroethanesulfonate), 1,3-butanediol bis(2,2-difluoroethanesulfonate), and 1,3-butanediol bis(2,2,2-trifluoroethanesulfonate); and 1,4-butanediol disulfonates such as 1,4-butanediol dimethanesulfonate, 1,4-butanediol diethanesulfonate, 1,4-butanediol bis(trifluoromethanesulfonate), 1,4-butanediol bis(pentafluoroethanesulfonate), 1,4-butanediol di(fluoromethanesulfonate), 1,4-butanediol bis(difluoromethanesulfonate), 1,4-butanediol di(2-fluoroethanesulfonate), 1,4-butanediol bis(2,2-difluoroethanesulfonate), and 1,4-butanediol bis(2,2,2-trifluoroethanesulfonate).

Especially preferred of these are ethanediol disulfonates such as ethanediol bis(trifluoromethanesulfonate), ethanediol bis(pentafluoroethanesulfonate), ethanediol di(fluoromethanesulfonate), ethanediol di(2-fluoroethanesulfonate), and ethanediol bis(2,2,2-trifluoroethanesulfonate); 1,2-propanediol disulfonates such as 1,2-propanediol bis(trifluoromethanesulfonate), 1,2-propanediol bis(pentafluoroethanesulfonate), 1,2-propanediol di(fluoromethanesulfonate), 1,2-propanediol di(2-fluoroethanesulfonate), and 1,2-propanediol bis(2,2,2-trifluoroethanesulfonate);

1,3-propanediol disulfonates such as 1,3-propanediol bis(trifluoromethanesulfonate), 1,3-propanediol bis(pentafluoroethanesulfonate), 1,3-propanediol di(fluoromethanesulfonate), 1,3-propanediol di(2-fluoroethanesulfonate), and 1,3-propanediol bis(2,2,2-trifluoroethanesulfonate); 1,2-butanediol disulfonates such as 1,2-butanediol bis(trifluoromethanesulfonate), 1,2-butanediol bis(pentafluoroethanesulfonate), 1,2-butanediol di(fluoromethanesulfonate), 1,2-butanediol di(2-fluoroethanesulfonate), and 1,2-butanediol bis(2,2,2-trifluoroethanesulfonate);

1,3-butanediol disulfonates such as 1,3-butanediol bis(trifluoromethanesulfonate), 1,3-butanediol bis(pentafluoroethanesulfonate), 1,3-butanediol di(fluoromethanesulfonate), 1,3-butanediol di(2-fluoroethanesulfonate), and 1,3-butanediol bis(2,2,2-trifluoroethanesulfonate); and 1,4-butanediol disulfonates such as 1,4-butanediol bis(trifluoromethanesulfonate), 1,4-butanediol bis(pentafluoroethanesulfonate), 1,4-butanediol di(fluoromethanesulfonate), 1,4-butanediol di(2-fluoroethanesulfonate), and 1,4-butanediol bis(2,2,2-trifluoroethanesulfonate).

[Nitrile Compounds]

The nitrile compounds are not particularly limited in their kinds so long as they are compounds having a nitrile group in the molecule. They may be compounds having two or more nitrile groups in the molecule.

Examples of the nitrile compounds include mononitrile compounds such as acetonitrile, propinonitzile, butyronitrile, isobutyronitrile, valeronitrile, isovaleronitrile, 2-methylbutyronitrile, trimethylacetonitrile, hexanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-penetenenitrile, 2-hexenenitrile, fluoroacetonitrile, difluoroacetonitrile, trifluoroacetonitrile, 2-fluoropropionitrile, 3-fluoropropionitrile, 2,2-difluoropionitrile, 2,3-difluoropropionitrile, 3,3-difluoropropionitrile, 2,2,3-trifluoropropionitrile, 3,3,3-trifluoropropionitrile, and pentafluoropropionitrile; dinitrile compounds such as malononitrile, succinonitrile, 2-methylsuccinonitrile, tetramethylsuccinonitrile, glutaronitrile, 2-methylglutaronitrile, adiponitrile, fumaronitrile, and 2-methyleneglutaronitrile; and tetranitrile compounds such as tetracyanoethylene.

Preferred of these from the standpoint of improving storability are acetonitrile, propinonitrile, butyronitrile, valeronitrile, crotononitrile, 3-methylcrotononitrile, malononitrile, succinonitrile, glutaronitrile, adiponitrile, and fumaronitrile.

More preferred are dinitrile compounds such as malononitrile, succinonitrile, glutaronitrile, adiponitrile, and fumaronitrile.

[Compounds Represented by General Formula (1)]

Examples of the alkyl groups having 1-12 carbon atoms in general formula (1) include linear, branched, or cyclic alkyl groups such as methyl, ethyl, n-propyl, isopropyl, n-butyl, isobutyl, sec-butyl, tert-butyl, pentyl, cyclopentyl, and cyclohexyl. The lower limit of the number of the carbon atoms of each of $R^1$ to $R^3$ is generally 1 or larger, and is preferably 2 or larger from the standpoint of inhibiting gas evolution. The upper limit thereof is generally 12 or smaller, and is preferably 8 or smaller, more preferably 4 or smaller, from the standpoints of solubility in the electrolytic solution and battery characteristics.

The alkyl groups may have been substituted with one or more fluorine atoms. Examples of the fluorine-atom-substituted groups include partly fluorinated alkyl and perfluoroalkyl groups derived from those alkyl groups, such as trifluoromethyl, trifluoroethyl, and pentafluoroethyl.

Symbol n in the general formula represents an integer of 0-6.

Examples of the compounds represented by general formula (1) include compounds in which n=0, such as trimethyl phosphonoformate, methyl diethyl phosphonoformate, methyl dipropyl phosphonoformate, methyl diputyl phosphonoformate, triethyl phosphonoformate, ethyl dimethyl phosphonoformate, ethyl dipropyl phosphonoformate, ethyl diputyl phosphonoformate, tripropyl phosphonoformate, propyldimethylphosphonoformate, propyl diethyl phosphonoformate, propyl diputyl phosphonoformate, tributyl phosphonoformate, butyl dimethyl phosphonoformate, butyl diethyl phosphonoformate, butyl dipropyl phosphonoformate, methyl bis(2,2,2-trifluoroethyl) phosphonoformate, ethyl bis(2,2,2-trifluoroethyl) phosphonoformate, propyl bis(2,2,2-trifluoroethyl) phosphonoformate, and butyl bis(2,2,2-trifluoroethyl) phosphonoformate;

compounds in which n=1, such as trimethyl phosphonoacetate, methyl diethyl phosphonoacetate, methyl dipropyl phosphonoacetate, methyl diputyl phosphonoacetate, triethyl phosphonoacetate, ethyl dimethyl phosphonoacetate, ethyl dipropyl phosphonoacetate, ethyl diputyl phosphonoacetate, tripropyl phosphonoacetate, propyl dimethyl phosphonoacetate, propyl diethyl phosphonoacetate, propyl diputyl phosphonoacetate, tributyl phosphonoacetate, butyl dimethyl phosphonoacetate, butyl diethyl phosphonoacetate, butyl dipropyl phosphonoacetate, methyl bis(2,2,2-trifluoroethyl) phosphonoacetate, ethyl bis(2,2,2-trifluoroethyl) phosphonoacetate, propyl bis(2,2,2-trifluoroethyl) phosphonoacetate, and butyl bis(2,2,2-trifluoroethyl) phosphonoacetate;

compounds in which n=2, such as trimethyl 3-phosphonopropionate, methyl diethyl 3-phosphonopropionate, methyl dipropyl 3-phosphonopropionate, methyl diputyl 3-phosphonopropionate, triethyl 3-phosphonopropionate, ethyl dimethyl 3-phosphonopropionate, ethyl dipropyl 3-phosphonopropionate, ethyl diputyl 3-phosphonopropionate, tripropyl 3-phosphonopropionate, propyl dimethyl 3-phosphonopropionate, propyl diethyl 3-phosphonopropionate, propyl diputyl 3-phosphonopropionate, tributyl 3-phosphonopropionate, butyl dimethyl 3-phosphonopropionate, butyl diethyl 3-phosphonopropionate, butyl dipropyl 3-phosphonopropionate, methyl bis(2,2,2-trifluoroethyl) 3-phosphonopropionate, ethyl bis(2,2,2-trifluoroethyl) 3-phosphonopropionate, propyl bis(2,2,2-trifluoroethyl) 3-phosphonopropionate, and butyl bis(2,2,2-trifluoroethyl) 3-phosphonopropionate; and compounds in which n=3, such as trimethyl 4-phosphonobutyrate, methyl diethyl 4-phosphonobutyrate, methyl dipropyl 4-phosphonobutyrate, methyl diputyl 4-phosphonobutyrate, triethyl 4-phosphonobutyrate, ethyl dimethyl 4-phosphonobutyrate, ethyl dipropyl 4-phosphonobutyrate, ethyl diputyl 4-phosphonobutyrate, tripropyl 4-phosphonobutyrate, propyl dimethyl 4-phosphonobutyrate, propyl diethyl 4-phosphonobutyrate, propyl diputyl 4-phosphonobutyrate, tributyl 4-phosphonobutyrate, butyl dimethyl 4-phosphonobutyrate, butyl diethyl 4-phosphonobutyrate, and butyl dipropyl 4-phosphonobutyrate.

Of these, the compounds in which n is 0, 1, or 2 are preferred from the standpoint of improving battery characteristics after high-temperature storage. Especially preferred are the compounds in which n is 1 or 2.

The at least one compound selected from the group consisting of those cyclic sulfonic acid ester compounds, di-sulfonic acid ester compounds, nitrile compounds, and compounds represented by general formula (1) may be one compound alone or may be any desired two or more compounds used in combination in any desired proportion.

The content of these compounds in the nonaqueous electrolyte is not particularly limited from the standpoint of producing the effects of the invention. However, the total content thereof is generally 0.001% by weight or higher, preferably 0.01% by weight or higher, more preferably 0.1% by weight or higher, based on the whole nonaqueous electrolyte. The upper limit of the total content thereof is generally 5% by weight or lower, preferably 4% by weight or lower, more preferably 3% by weight or lower. When the concentration of these compounds is too low, there are cases where the improving effect is difficult to obtain. On the other hand, too high concentrations thereof may lead to a decrease in charge/discharge efficiency.

The reasons why this nonaqueous electrolyte according to the invention improves high-temperature storability have not been elucidated. However, this effect is presumed to be attained by the following mechanism, although the invention should not be construed as being limited by the following mechanism.

Cyclic sulfonic acid ester compounds, di-sulfonic acid ester compounds, nitrile compounds, and compounds represented by general formula (1) are adsorbed onto or form a protective coating film on the surface of the positive electrode and can thus inhibit the positive electrode from deteriorating during high-temperature storage. However, these compounds tend to suffer reductional decomposition on the negative-electrode side. Namely, use of these compounds tends to enhance side reactions on the negative-electrode side and increase the resistance of the negative electrode, resulting in reduced battery characteristics. It is thought that when the electrolytic solution contains a fluorinated cyclic carbonate having two or more fluorine atoms, the fluorinated cyclic carbonate having two or more fluorine atoms can form a coating film on the surface of the negative electrode before the reaction of those compounds to thereby inhibit those compounds from undergoing excessive reactions.

Still a further aspect of the invention is a nonaqueous electrolyte which includes at least one electrolyte and a nonaqueous solvent for dissolving the electrolyte, and is characterized by being an electrolytic solution for use in a high-voltage battery to be used at a final charge voltage of 4.3 V or higher, and by containing at least one fluorinated cyclic carbonate having two or more fluorine atoms.

(High-Voltage Battery to be Used at Final Charge Voltage of 4.3 V or Higher)

This nonaqueous electrolyte according to the invention is characterized by being for use in a high-voltage battery to be used at a final charge voltage of 4.3 V or higher.

The lower limit of voltage for the high-voltage battery to be used at a final charge voltage of 4.3 V or higher is generally 4.3 V or higher, preferably 4.35 V or higher. Although the upper limit thereof is not particularly limited, it is 6 V or lower, preferably 5 V or lower, especially preferably 4.8 V or lower. Voltages higher than that lower limit are preferred because the effect of improving energy density and cycle characteristics are satisfactory.

A high-voltage battery can be constituted by suitably selecting the kinds of active materials and a balance between positive and negative electrodes.

Details of the constitution thereof will be described later.

The battery according to the invention has undergone a voltage of 4.3 V or higher at least once, because the final charge voltage thereof is 4.3 V or higher. There has been a problem that batteries which have undergone a voltage of 4.3 V or higher at least once deteriorate considerably in battery characteristics probably due to side reactions between the positive electrode and the electrolytic solution.

In contrast, in the battery according to the invention, the positive electrode and negative electrode and the electrolytic solution are less apt to decompose. This battery can hence be repeatedly charged/discharged while retaining high battery characteristics.

The nonaqueous electrolytes according to the invention may be used in combination thereof.

For example, use may be made of a nonaqueous electrolyte which includes an electrolyte and a nonaqueous solvent for dissolving the electrolyte and in which the nonaqueous electrolyte contains a cyclic carbonate having an unsaturated bond and/or an aromatic compound having 7-18 carbon atoms in total and/or the nonaqueous solvent contains diethyl carbonate and/or the nonaqueous electrolyte contains at least one compound selected from the group consisting of cyclic sulfonic acid ester compounds, di-sulfonic acid ester compounds, nitrile compounds, and compounds represented by general formula (1), and which further contains a fluorinated cyclic carbonate having two or more fluorine atoms. Furthermore, such nonaqueous electrolytes may be ones for use in a high-voltage battery to be used at a final charge voltage of 4.3 V or higher.

(Other Compounds)

The nonaqueous electrolytes according to the invention each may contain various other compounds as auxiliaries unless this lessens the effects of the invention.

Examples of such optional auxiliaries include carbonate compounds such as fluoroethylene carbonate, erythritan carbonate, spiro-bis-dimethylene carbonate, and methoxyethyl methyl carbonate;

carboxylic acid anhydrides such as succinic anhydride, glutaric anhydride, maleic anhydride, itaconic anhydride, citraconic anhydride, glutaconic anhydride, diglycolic anhydride, cyclohexanedicarboxylic anhydride, cyclopentanetetracarboxylic dianhydride, and phenylsuccinic anhydride;

spiro compounds such as 2,4,8,10-tetraoxaspiro[5.5]undecane and 1,9-divinyl-2,4,8,10-tetraoxaspiro[5.5]undecane;

sulfur-containing compounds such as ethylene sulfite, propylene sulfite, methyl methanesulfonate, ethyl methanesulfonate, methyl methoxymethanesulfonate, methyl 2-methoxyethanesulfonate, sulfolane, sulfolane, dimethyl sulfone, diphenyl sulfone, N,N-dimethylmethanesulfonamide, and N,N-diethylmethanesulfonamide;

nitrogen-containing compounds such as 1-methyl-2-pyrrolidinone, 1-methyl-2-piperidone, 3-methyl-2-oxazolidinone, 3-dimethyl-2-imidazolidinone, and N-methyl succinimide;

hydrocarbon compounds such as heptane, octane, nonane, decane, cycloheptane, methylcyclohexane, ethylcyclohexane, propylcyclohexane, n-butylcyclohexane, t-butylcyclohexane, and dicyclohexyl; and fluorinated benzenes such as fluorobenzene, difluorobenzene, and hexafluorobenzene.

These compounds may be used in combination of two or more thereof.

The proportion of these auxiliaries in the nonaqueous electrolyte is not particularly limited from the standpoint of producing the effects of the invention. However, the proportion thereof is generally 0.01% by weight or higher, preferably 0.1% by weight or higher, especially preferably 0.2% by weight or higher. The upper limit thereof is generally 5% by weight or lower, preferably 3% by weight or lower, especially preferably 1% by weight or lower. By adding those auxiliaries, capacity retentivity and cycle characteristics after high-temperature storage can be improved. When the concentration thereof is lower than that lower limit, there are cases where the auxiliaries produce almost no effect. Conversely, too high concentrations thereof may result in cases where battery characteristics such as high-load discharge characteristics decrease.

(Preparation of Electrolytic Solutions)

The nonaqueous electrolytes according to the invention each can be prepared by dissolving an electrolyte and at least one compound selected from the group consisting of fluorinated cyclic carbonates having two or more fluorine atoms optionally together with other compound(s) in a nonaqueous solvent. In preparing the nonaqueous electrolyte, it is preferred that each raw material should be dehydrated beforehand in order to reduce the water content of the electrolytic solution to be obtained. It is desirable that each raw material should be dehydrated to generally 50 ppm or lower, preferably 30 ppm or lower, especially preferably 10 ppm or lower. It is also possible to conduct dehydration, deacidification treatment, etc. after the electrolyte solution has been prepared.

The nonaqueous electrolytes of the invention are suitable for use as electrolytes for secondary batteries among nonaqueous-electrolyte batteries, i.e., nonaqueous-electrolyte secondary batteries such as, e.g., lithium secondary batteries. The nonaqueous-electrolyte secondary battery employing any of the electrolytes of the invention is explained below.

<Nonaqueous-Electrolyte Secondary Battery>

The nonaqueous-electrolyte secondary battery of the invention is a nonaqueous-electrolyte battery including a negative electrode and a positive electrode which are capable of occluding/releasing lithium ions and further including a nonaqueous electrolyte, and is characterized in that the nonaqueous electrolyte is any of the nonaqueous electrolytes described above.

(Battery Constitution)

The nonaqueous-electrolyte secondary battery according to the invention is a nonaqueous-electrolyte battery including a negative electrode and a positive electrode which are capable of occluding/releasing lithium ions and further including a nonaqueous electrolyte like known nonaqueous-electrolyte secondary batteries, provided that it is produced using any of the electrolytes of the invention described above. Usually, it is obtained by packing a positive electrode and a negative electrode into a case while keeping the electrodes separate from each other with a porous film impregnated with the nonaqueous electrolyte according to the invention. Consequently, the shape of the secondary battery according to the invention is not particularly limited, and may be any of cylindrical, prismatic, laminate, coin, and large-size types and the like.

(Negative Electrode)

As a negative-electrode active material, use can be made of carbonaceous materials or metal compounds which are capable of occluding/releasing lithium and of lithium metal, lithium alloys, and the like. These negative-electrode active materials may be used alone or as a mixture of two or more thereof. Preferred of these are carbonaceous materials and metal compounds capable of occluding and releasing lithium.

Especially preferred of the carbonaceous materials are graphite and a material obtained by coating the surface of graphite with carbon which is more amorphous than graphite.

The graphite preferably is one in which the lattice plane (002) has a value of d (interplanar spacing), as determined through X-ray diffraction by the method of the Japan Society for Promotion of Scientific Research, of 0.335-0.338 nm, especially 0.335-0.337 nm. The crystallite size (Lc) thereof as determined through X-ray diffraction by the method of the Japan Society for Promotion of Scientific Research is generally 30 nm or larger, preferably 50 nm or larger, especially preferably 100 nm or larger. The ash content thereof is generally 1% by weight or lower, preferably 0.5% by weight or lower, especially preferably 0.1% by weight or lower.

The material obtained by coating the surface of graphite with amorphous carbon preferably is one which is constituted of graphite in which the lattice plane (002) has a value of d as determined through X-ray diffraction of 0.335-0.338 nm as a core material and a carbonaceous material adherent to the surface of the core material and higher than the core material in the value of d of the lattice plane (002) as determined through X-ray diffraction, and in which the proportion of the core material to the carbonaceous material higher than the core material in the value of d of the lattice plane (002) as determined through X-ray diffraction is from 99/1 to 80/20 by weight. When this material is used, a negative electrode having a high capacity and less apt to react with the electrolytic solution can be produced.

The particle diameter of each of the carbonaceous materials, in terms of median diameter as determined by the laser diffraction/scattering method, is generally 1 µm or larger, preferably 3 µm or larger, more preferably 5 µm or larger, most preferably 7 µm or larger, and is generally 100 µm or smaller, preferably 50 µm or smaller, more preferably 40 µm or smaller, most preferably 30 µm or smaller.

The specific surface area of each of the carbonaceous materials as determined by the BET method is generally 0.3 $m^2/g$ or larger, preferably 0.5 $m^2/g$ or larger, more preferably 0.7 $m^2/g$ or larger, most preferably 0.8 $m^2/g$ or larger, and is generally 25.0 $m^2/g$ or smaller, preferably 20.0 $m^2/g$ or smaller, more preferably 15.0 $m^2/g$ or smaller, most preferably 10.0 $m^2/g$ or smaller.

The carbonaceous materials preferably are ones which, when analyzed by Raman spectroscopy using argon ion laser light, have a value of R expressed by $I_B$ to $I_A$ ratio (i.e., $I_B/I_A$) in the range of 0.01-0.7, provided that $I_A$ is the peak intensity of a peak $P_A$ appearing in the range of 1,570-1,620 $cm^{-1}$ and $I_B$ is the peak intensity of a peak $P_B$ appearing in the range of 1,300-1,400 $cm^{-1}$. Also preferred are ones in which the peak appearing in the range of 1,570-1,620 $cm^{-1}$ has a half-value width of generally 26 $cm^{-1}$ or smaller, especially 25 $cm^{-1}$ or smaller.

Examples of the metal compounds capable of occluding and releasing lithium include compounds containing a metal such as Ag, Zn, Al, Ga, In, Si, Ge, Sn, Pb, P, Sb, Bi, Cu, Ni, Sr, or Ba. These metals may be used as elemental metals, oxides, alloys with lithium, etc. In the invention, ones containing an element selected from Si, Sn, Ge, and Al are preferred. More preferred are oxides or lithium alloys of a metal selected from Si, Sn, and Al. These materials may be in the form of a powder or thin film or may be crystalline or amorphous.

Metal compounds capable of occluding/releasing lithium or oxides or lithium alloys of the metals generally have a larger capacity per unit weight than carbonaceous materials represented by graphite. These metallic materials are hence suitable for use in lithium secondary batteries, which are required to have a higher energy density.

The metal compounds capable of occluding/releasing lithium or oxides or lithium alloys of the metals are not particularly limited in their average particle diameters from the standpoint of producing the effects of the invention. However, the average particle diameter of each of these metallic materials is generally 50 µm or smaller, preferably 20 µm or smaller, especially preferably 10 µm or smaller, and is generally 0.1 µm or larger, preferably 1 µm or larger, especially preferably 2 µm or larger. When the average particle diameter exceeds that upper limit, there is a possibility that the electrode might undergo enhanced expansion, resulting in reduced cycle characteristics. When the average particle diameter thereof is smaller than that lower limit, there is a possibility that current collection might be difficult, resulting in an insufficient capacity.

(Positive Electrode)

Examples of positive-electrode active materials include materials capable of occluding/releasing lithium, such as lithium-transition metal composite oxide materials, e.g., lithium-cobalt oxides, lithium-nickel oxides, and lithium-manganese oxides. These compounds may be $Li_xCoO_2$, $Li_xNiO_2$, $Li_xMnO_2$, $Li_xCO_{1-y}M_yO_2$, $Li_xNi_{1-y}M_yO_2$, $Li_xMn_{1-y}M_yO_2$, etc., wherein M generally is at least one member selected from Fe, Co, Ni, Mn, Mg, Cu, Zn, Al, Sn, B, Ga, Cr, V, Sr, and Ti, $0.4 \le x \le 1.2$, and $0 \le y \le 0.6$. Examples of those compounds further include $Li_xMn_aNi_bCo_cO_2$ (wherein $0.4 \le x \le 1.2$ and a+b+c=1).

In particular, composite oxides in which cobalt, nickel, or manganese has been partly replaced by one or more other metals and which are represented by $Li_xCo_{1-y}M_yO_2$, $Li_xMn_{1-y}M_yO_2$, or the like and ones represented by $Li_xMn_aNi_bCo_cO_2$ (wherein $0.4 \le x \le 1.2$, a+b+c=1, and |a−b|<0.1) are preferred because these composite oxides can have a stabilized structure.

Such positive-electrode active materials may be used alone or in combination of two or more thereof.

It is also possible to use a material constituted of any of those positive-electrode active materials and a substance adherent to the surface of the positive-electrode active material as a base and differing in composition from the material constituting the active material. Examples of the surface-adherent substance include oxides such as aluminum oxide, silicon oxide, titanium oxide, zirconium oxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, and carbonates such as lithium carbonate, calcium carbonate, and magnesium carbonate.

The amount of the surface-adherent substance is not particularly limited from the standpoint of producing the effects of the invention. However, the lower limit thereof is preferably 0.1 ppm or larger, more preferably 1 ppm or larger, even more preferably 10 ppm or larger, in terms of mass ppm of the positive-electrode active material. The upper limit thereof is preferably 20% by mass or smaller, more preferably 10% by mass or smaller, even more preferably 5% by mass or smaller, based on the positive-electrode active material. The surface-adherent substance can inhibit the nonaqueous electrolyte from undergoing an oxidation reaction on the surface of the positive-electrode active material, whereby an improvement in battery life can be attained. However, in case where the amount of the substance adhered is too small, the effect of the adherent substance is not sufficiently produced. When the amount thereof is too larger, there are cases where the adherent substance inhibits the occlusion/release of lithium ions, resulting in increased resistance.

(Electrodes)

As a binder for binding an active material, use can be made of any desired material stable to the solvent and electrolytic solution to be used for electrode production. Examples thereof include fluororesins such as poly(vinylidene fluoride) and polytetrafluoroethylene, polyolefins such as polyethylene and polypropylene, polymers having unsaturated bonds and copolymers thereof, such as styrene/butadiene rubbers, isoprene rubbers, and butadiene rubbers, and acrylic acid polymers and copolymers thereof, such as ethylene/acrylic acid copolymers and ethylene/methacrylic acid copolymers.

A thickener, conductive material, filler, and the like may be incorporated into each electrode in order to enhance mechanical strength and electrical conductivity.

Examples of the thickener include carboxymethyl cellulose, methyl cellulose, hydroxymethyl cellulose, ethyl cellulose, poly(vinyl alcohol), oxidized starch, phosphorylated starch, and casein.

Examples of the conductive material include metallic materials such as copper and nickel and carbon materials such as graphite and carbon black.

The electrodes may be produced in an ordinary manner. For example, each electrode can be produced by adding a binder, thickener, conductive material, solvent, etc. to a positive-electrode or negative-electrode active material to obtain a slurry, applying this slurry to a current collector, drying the slurry applied, and then pressing the coated current collector.

Furthermore, a mixture obtained by adding a binder, conductive material, etc. to an active material may be subjected as it is to roll forming to obtain a sheet electrode or to compression molding to obtain a pellet electrode. Alternatively, a thin film of an electrode material may be formed on a current collector by a technique such as, e.g., vapor deposition, sputtering, or plating.

In the case where graphite is used as a negative-electrode active material, the negative-electrode active-material layer after drying and pressing has a density of generally 1.45 g/cm$^3$ or higher, preferably 1.55 g/cm$^3$ or higher, more preferably 1.60 g/cm$^3$ or higher, especially preferably 1.65 g/cm$^3$ or higher.

The positive-electrode active-material layer after drying and pressing has a density of generally 2.0 g/cm$^3$ or higher, preferably 2.5 g/cm$^3$ or higher, more preferably 3.0 g/cm$^3$ or higher.

As current collectors, various materials can be used. However, metals or alloys are generally used. Examples of the current collector for the negative electrode include copper, nickel, and stainless steel. Preferred is copper. Examples of the current collector for the positive electrode include metals such as aluminum, titanium, and tantalum and alloys thereof. Preferred is aluminum or an alloy thereof.

(Separator and Case)

A porous film (separator) is disposed between the positive electrode and negative electrode in order to prevent short-circuiting. In this case, the electrolytic solution is incorporated by infiltrating it into the porous film. The material and shape of the porous film are not particularly limited so long as the porous film is stable to the electrolytic solution and has excellent liquid retentivity. It is preferred to use a porous sheet, nonwoven fabric, or the like produced from a polyolefin such as polyethylene or polypropylene.

The battery case to be used in the battery according to the invention also is made of any desired material. Use may be made of nickel-plated iron, stainless steel, aluminum or an alloy thereof, nickel, titanium, a laminated film, or the like.

The operating voltage of the nonaqueous-electrolyte secondary battery of the invention described above is generally in the range of from 2 V to 6 V.

EXAMPLES

The invention will be explained below in more detail by reference to Examples and Comparative Examples. However, the invention should not be construed as being limited to the following Examples unless the invention departs from the spirit thereof.

Methods used for evaluating the batteries obtained in the following Examples and Comparative Examples are shown below.

[Capacity Evaluation]

At 25° C., a nonaqueous-electrolyte secondary battery kept in the state of being sandwiched between glass plates for the purpose of enhancing contact between the electrodes was charged to 4.2 V at a constant current corresponding to 0.2 C and then discharged to 3 V at a constant current of 0.20. This operation as one cycle was conducted three times to stabilize the battery. In a fourth cycle, the battery was charged to 4.2 V at a constant current of 0.5 C, subsequently charged at a constant voltage of 4.2 V until the current value reached 0.05 C, and then discharged to 3 V at a constant current of 0.2 C to determine an initial discharge capacity.

In this connection, 1 C means the value of current at which the reference capacity of a battery is discharged over 1 hour; 0.2 C means ⅕ the current value.

[Evaluation of Cycle Characteristics]

A battery which had undergone the capacity evaluation test was subjected at 45° C. to a cycle test in which the battery was charged to 4.2 V at a constant current of 0.5 C, subsequently charged at a constant voltage of 4.2 V until the current value reached 0.05 C, and then discharged to 3 V at a constant current of 1 C. The discharge capacity determined in the first cycle was taken as 100, and the discharge capacity (%) after 300 cycles was determined.

[Evaluation of High-Voltage Cycle Characteristics]

A battery which had undergone the capacity evaluation test was subjected at 45° C. to a cycle test in which the battery was charged to 4.35 V at a constant current of 0.5 C, subsequently charged at a constant voltage of 4.35 V until the current value reached 0.05 C, and then discharged to 3 V at a constant current of 1 C. The discharge capacity determined in the first cycle was taken as 100, and the discharge capacity (%) after 50 cycles was determined.

[Evaluation of Discharge Storage Characteristics]

A battery which had undergone the capacity evaluation test was stored at 60° C. and examined for voltage change. The time period required for the battery to decrease in voltage from 3 V to 2.5 V was measured as discharge storage period. The longer the discharge storage period, the more the battery is inhibited from deteriorating during storage (deteriorating due to side reactions within the battery, mainly side reactions on the negative-electrode side) and the more the battery is stable.

[Evaluation of Continuous-Charge Characteristics]

A battery which had undergone the capacity evaluation test was immersed in an ethanol bath to measure the volume of the battery. Thereafter, at 60° C., this battery was charged at a constant current of 0.5 C. At the time when the voltage reached 4.25 V, the charging was changed to constant-voltage charging and the battery was continuously charged for 1 week.

The battery was cooled and then immersed in an ethanol bath to measure the volume of the battery. The amount of a gas evolved was determined from a volume change through the continuous charge.

After the determination of the evolved-gas amount, the battery was discharged at 25° C. to 3 V at a constant current of 0.2 C to determine the residual capacity remaining after the continuous charge test. The proportion of the discharge capacity after the continuous charge test to the initial discharge capacity was determined, and this proportion was taken as residual capacity after continuous charge (%).

Example 1

Production of Negative Electrode

Ninety-four parts by weight of a natural-graphite powder in which the lattice plane (002) had a value of d as determined by X-ray diffraction of 0.336 nm, which had a crystallite size (Lc) of 652 nm, an ash content of 0.07% by weight, a median diameter as determined by the laser diffraction/scattering method of 12 μm, a specific surface area as determined by the BET method of 7.5 m$^2$/g, and a value of R ($=I_B/I_A$) as determined by Raman spectroscopy using argon ion laser light of 0.12, and in which the peak appearing in the range of 1,570-1,620 cm$^{-1}$ had a half-value width of 19.9 cm$^{-1}$ was mixed with a 6 parts by weight of poly(vinylidene fluoride). N-Methyl-2-pyrrolidone was added to the mixture to slurry it. This slurry was evenly applied to one side of a copper foil having a thickness of 12 μm and dried. The resultant coated film was pressed so as to result in a negative-electrode active-material layer having a density of 1.65 g/cm$^3$. Thus, a negative electrode was obtained.

[Production of Positive Electrode]

Ninety parts by weight of LiCoO$_2$ was mixed with 4 parts by weight of carbon black and 6 parts by weight of poly (vinylidene fluoride) (trade name "KF-1000", manufactured by Kureha Chemical Industry Co., Ltd.)-N-Methyl-2-pyrrolidone was added to the mixture to slurry it. This slurry was evenly applied to each side of an aluminum foil having a thickness of 15 μm and dried. The resultant coated foil was pressed so as to result in a positive-electrode active-material layer having a density of 3.0 g/cm$^3$. Thus, a positive electrode was obtained.

[Production of Electrolytic Solution]

In a dry argon atmosphere, 97 parts by weight of an ethylene carbonate/ethyl methyl carbonate mixture (volume ratio, 3:7) was mixed with 2 parts by weight of vinylene carbonate and 1 part by weight of cis 4,5-difluoro-1,3-dioxolan-2-one. Subsequently, sufficiently dried LiPF$_6$ was dissolved in the resultant mixture in such an amount as to result in a proportion of 1.0 mol/L. Thus, an electrolytic solution was obtained.

[Production of Lithium Secondary Battery]

The positive electrode and negative electrode described above and a separator made of polyethylene were superposed in the order of negative electrode/separation/positive electrode/separator/negative electrode to produce a battery element. This battery element was inserted into a bag made of a laminated film obtained by coating each side of aluminum (thickness, 40 μm) with a resin layer, with the terminals of the positive and negative electrodes protruding from the bag, Thereafter, the electrolytic solution was injected into the bag, which was sealed under vacuum to produce a sheet-form battery. This battery was evaluated for cycle characteristics and discharge storage characteristics. The results of the evaluation are shown in Table 1.

Example 2

A sheet-form lithium secondary battery was produced in the same manner as in Example 1, except that use was made of an electrolytic solution prepared by mixing 97.5 parts by weight of an ethylene carbonate/ethyl methyl carbonate mixture (volume ratio, 3:7) with 2 parts by weight of vinylene carbonate and 0.5 parts by weight of cis-4,5-difluoro-1,3-dioxolan-2-one and then dissolving sufficiently dried LiPF$_6$ therein in such an amount as to result in a proportion of 1.0 mol/L. This battery was evaluated for cycle characteristics and discharge storage characteristics. The results of the evaluation are shown in Table 1.

Example 3

A sheet-form lithium secondary battery was produced in the same manner as in Example 1, except that use was made of an electrolytic solution prepared by mixing 97.5 parts by weight of an ethylene carbonate/ethyl methyl carbonate mixture (volume ratio, 3:7) with 1.5 parts by weight of vinylene carbonate, 0.5 parts by weight of vinylethylene carbonate, and 0.5 parts by weight of cis-4,5-difluoro-1,3-dioxolan-2-one and then dissolving sufficiently dried LiPF$_6$ therein in such an amount as to result in a proportion of 1.0 mol/L. This battery was evaluated for cycle characteristics. The results of the evaluation are shown in Table 1.

Example 4

A sheet-form lithium secondary battery was produced in the same manner as in Example 1, except that trans-4,5-difluoro-1,3-dioxolan-2-one was used in place of the cis-4,5-difluoro-1,3-dioxolan-2-one in preparing the electrolytic solution of Example 1. This battery was evaluated for cycle characteristics. The results of the evaluation are shown in Table 1.

Example 5

A sheet-form lithium secondary battery was produced in the same manner as in Example 1, except that use was made of an electrolytic solution prepared by mixing 97 parts by weight of an ethylene carbonate/ethyl methyl carbonate/dimethyl carbonate mixture (volume ratio, 2:4:4) with 2 parts by weight of vinylene carbonate, and 1 part by weight of cis-4, 5-difluoro-1,3-dioxolan-2-one and then dissolving sufficiently dried LiPF$_6$ therein in such an amount as to result in a proportion of 1.0 mol/L. This battery was evaluated for cycle characteristics. The results of the evaluation are shown in Table 1.

Comparative Example 1

A sheet-form lithium secondary battery was produced in the same manner as in Example 1, except that use was made of an electrolytic solution prepared by mixing 98 parts by weight of an ethylene carbonate/ethyl methyl carbonate mixture (volume ratio, 3:7) with 2 parts by weight of vinylene carbonate and then dissolving sufficiently dried $LiPF_6$ therein in such an amount as to result in a proportion of 1.0 mol/L. This battery was evaluated for cycle characteristics and discharge storage characteristics. The results of the evaluation are shown in Table 1.

Comparative Example 2

A sheet-form lithium secondary battery was produced in the same manner as in Example 1, except that use was made of an electrolytic solution prepared by mixing 98 parts by weight of an ethylene carbonate/ethyl methyl carbonate mixture (volume ratio, 3:7) with 2 parts by weight of cis-4,5-difluoro-1,3-dioxolan-2-one and then dissolving sufficiently dried $LiPF_6$ therein in such an amount as to result in a proportion of 1.0 mol/L. This battery was evaluated for cycle characteristics and discharge storage characteristics. The results of the evaluation are shown in Table 1.

Comparative Example 3

A sheet-form lithium secondary battery was produced in the same manner as in Example 1, except that use was made of an electrolytic solution prepared by dissolving sufficiently dried $LiPF_6$ in an ethylene carbonate/ethyl methyl carbonate mixture (volume ratio, 3:7) in such an amount as to result in a proportion of 1.0 mol/L. This battery was evaluated for cycle characteristics and discharge storage characteristics. The results of the evaluation are shown in Table 1.

Comparative Example 4

A sheet-form lithium secondary battery was produced in the same manner as in Example 1, except that use was made of an electrolytic solution prepared by mixing 97 parts by weight of an ethylene carbonate/ethyl methyl carbonate mixture (volume ratio, 3:7) with 2 parts by weight of vinylene carbonate and 1 part by weight of 4-fluoro-1,3-dioxolan-2-one and then dissolving sufficiently dried $LiPF_6$ therein in such an amount as to result in a proportion of 1.0 mol/L. This battery was evaluated for cycle characteristics. The results of the evaluation are shown in Table 1.

TABLE 1

Cycle Characteristics and Discharge Storage Characteristics

| | Cycle characteristics (%) | Evaluation of discharge storage characteristics (hr) |
|---|---|---|
| Example 1 | 86 | 294 |
| Example 2 | 85 | 345 |
| Example 3 | 87 | — |
| Example 4 | 84 | — |
| Example 5 | 88 | — |
| Comparative Example 1 | 54 | 379 |
| Comparative Example 2 | 77 | 90 |
| Comparative Example 3 | 52 | 155 |
| Comparative Example 4 | 69 | — |

As apparent from Table 1, it can be seen that the batteries according to the invention are excellent in cycle characteristics and storability.

Example 6

A sheet-form lithium secondary battery was produced in the same manner as in Example 1, except that use was made of an electrolytic solution prepared by mixing 96.5 parts by weight of an ethylene carbonate/ethyl methyl carbonate/dimethyl carbonate mixture (volume ratio, 2:4:4) with 2 parts by weight of vinylene carbonate, 0.5 parts by weight of cis-4,5-difluoro-1,3-dioxolan-2-one, and 1 part by weight of cyclohexylbenzene and then dissolving sufficiently dried $LiPF_6$ therein in such an amount as to result in a proportion of 1.0 mol/L. This battery was evaluated for continuous-charge characteristics. The results of the evaluation are shown in Table 2.

Example 7

A sheet-form lithium secondary battery was produced in the same manner as in Example 1, except that 2,4-dilfluoroaniole was used in place of the cyclohexylbenzene in preparing the electrolytic solution of Example 6. This battery was evaluated for continuous-charge characteristics. The results of the evaluation are shown in Table 2.

Comparative Example 5

A sheet-form lithium secondary battery was produced in the same manner as in Example 1, except that use was made of an electrolytic solution prepared by mixing 97 parts by weight of an ethylene carbonate/ethyl, methyl carbonate/dimethyl carbonate mixture (volume ratio, 2:4:4) with 2 parts by weight of vinylene carbonate and 1 part by weight of cyclohexylbenzene and then dissolving sufficiently dried $LiPF_6$ therein in such an amount as to result in a proportion of 1.0 mol/L. This battery was evaluated for continuous-charge characteristics. The results of the evaluation are shown in Table 1.

Comparative Example 6

A sheet-form lithium secondary battery was produced in the same manner as in Example 1, except that 2,4-dilfluoroaniole was used in place of the cyclohexylbenzene in preparing the electrolytic solution of Comparative Example 5. This battery was evaluated for continuous-charge characteristics. The results of the evaluation are shown in Table 2.

TABLE 2

Continuous-Charge Characteristics

| | Amount of gas generated through continuous charge (mL) | Residual capacity after contiguous charge (%) |
|---|---|---|
| Example 6 | 0.87 | 89 |
| Example 7 | 0.74 | 91 |
| Comparative Example 5 | 1.76 | 74 |
| Comparative Example 6 | 1.34 | 82 |

As apparent from Table 2, the batteries according to the invention can be inhibited from increasing in gas evolution and decreasing considerably in discharge characteristics through high-temperature storage (through the continuous charge test), although the electrolytes each contain an aromatic compound having 7-18 carbon atoms in total.

Example 8

A sheet-form lithium secondary battery was produced in the same manner as in Example 1, except that use was made of an electrolytic solution prepared by mixing 99.5 parts by weight of an ethylene carbonate/ethyl methyl carbonate/diethyl carbonate mixture (volume ratio, 3:1:6) with 0.5 parts by weight of cis-4,5-difluoro-1,3-dioxolan-2-one and then dissolving sufficiently dried $LiPF_6$ therein in such an amount as to result in a proportion of 1.0 mol/L. This battery was evaluated for high-voltage cycle characteristics and continuous-charge characteristics. The results of the evaluation are shown in Table 3.

Comparative Example 7

A sheet-form lithium secondary battery was produced in the same manner as in Example 1, except that use was made of an electrolytic solution prepared by dissolving sufficiently dried $LiPF_6$ in ethylene carbonate and ethyl methyl carbonate (volume ratio, 3:7) in such an amount as to result in a proportion of 1.0 mol/L. This battery was evaluated for high-voltage cycle characteristics and continuous-charge characteristics. The results of the evaluation are shown in Table 3.

Comparative Example 8

A sheet-form lithium secondary battery was produced in the same manner as in Example 1, except that use was made of an electrolytic solution prepared by dissolving sufficiently dried $LiPF_6$ in an ethylene carbonate/ethyl methyl carbonate/diethyl carbonate mixture (volume ratio, 3:1:6) in such an amount as to result in a proportion of 1.0 mol/L. This battery was evaluated for high-voltage cycle characteristics and continuous-charge characteristics. The results of the evaluation are shown in Table 3.

Example 9

A sheet-form lithium secondary battery was produced in the same manner as in Example 1, except that use was made of an electrolytic solution prepared by mixing 99 parts by weight of an ethylene carbonate/Ethyl methyl carbonate/diethyl carbonate mixture (volume ratio, 3:1:6) with 0.5 parts by weight of cis-4,5-difluoro-1,3-dioxolan-2-one and 0.5 parts by weight of 1,3-propanesultone and then dissolving sufficiently dried $LiFF_6$ therein in such an amount as to result in a proportion of 1.0 mol/L. This battery was evaluated for high-voltage cycle characteristics and continuous-charge characteristics. The results of the evaluation are shown in Table 3.

Example 10

A sheet-form lithium secondary battery was produced in the same manner as in Example 1, except that use was made of an electrolytic solution prepared by mixing 99 parts by weight of an ethylene carbonate/ethyl methyl carbonate/diethyl carbonate mixture (volume ratio, 3:1:6) with 0.5 parts by weight of cis-4,5-difluoro-1,3-dioxolan-2-one and 0.5 parts weight of 1,4-butanediol bis(2,2,2-trifluoroethanesulfonate) and then dissolving sufficiently dried $LiPF_6$ therein in such an amount as to result in a proportion of 1.0 mol/L. This battery was evaluated for high-voltage cycle characteristics and continuous-charge characteristics. The results of the evaluation are shown in Table 3.

Example 11

A sheet-form lithium secondary battery was produced in the same manner as in Example 1, except that use was made of an electrolytic solution prepared by mixing 99 parts by weight of an ethylene carbonate/ethyl methyl carbonate/diethyl carbonate mixture (volume ratio, 3:1:6) with 0.5 parts by weight of cis-4,5-difluoro-1,3-dioxolan-2-one and 0.5 parts by weight of succinonitrile and then dissolving sufficiently dried $LiPF_6$ therein in such an amount as to result in a proportion of 1.0 mol/L. This battery was evaluated for high-voltage cycle characteristics and continuous-charge characteristics. The results of the evaluation are shown in Table 3.

Example 12

A sheet-form lithium secondary battery was produced in the same manner as in Example 1, except that use was made of an electrolytic solution prepared by mixing 99 parts by weight of an ethylene carbonate/ethyl methyl carbonate/diethyl carbonate mixture (volume ratio, 3:1:6) with 0.5 parts by weight of cis-4,5-difluoro-1,3-dioxolan-2-one and 0.5 parts by weight of triethyl phosphonoacetate and then dissolving sufficiently dried $LiPF_6$ therein in such an amount as to result in a proportion of 1.0 mol/L. This battery was evaluated for high-voltage cycle characteristics and continuous-charge characteristics. The results of the evaluation are shown in Table 3.

Example 13

A sheet-form lithium secondary battery was produced in the same manner as in Example 1, except that use was made of an electrolytic solution prepared by mixing 98.5 parts by weight of an ethylene carbonate/ethyl methyl carbonate/diethyl carbonate mixture (volume ratio, 3:1:6) with 0.5 parts by weight of cis-4,5-difluoro-1,3-dioxolan-2-one, 0.5 parts by weight of vinylene carbonate, and 0.5 parts by weight of triethyl phosphonoacetate and then dissolving sufficiently dried $LiPF_6$ therein in such an amount as to result in a proportion of 1.0 mol/L. This battery was evaluated for high-voltage cycle characteristics and continuous-charge characteristics. The results of the evaluation are shown in Table 3.

Example 14

A sheet-form lithium secondary battery was produced in the same manner as in Example 1, except that use was made of an electrolytic solution prepared by mixing 99 parts by weight of an ethylene carbonate/ethyl methyl carbonate mixture (volume ratio, 3:7) with 0.5 parts by weight of cis-4,5-difluoro-1,3-dioxolan-2-one and 0.5 parts by weight of triethyl phosphonoacetate and then dissolving sufficiently dried $LiPF_6$ therein in such an amount as to result in a proportion of 1.0 mol/L. This battery was evaluated for high-voltage cycle characteristics and continuous-charge characteristics. The results of the evaluation are shown in Table 3.

Comparative Example 9

A sheet-form lithium secondary battery was produced in the same manner as in Example 1, except that use was made of an electrolytic solution prepared by mixing 99.5 parts by weight of an ethylene carbonate/ethyl methyl carbonate/diethyl carbonate mixture (volume ratio, 3:1:6) with 0.5 parts by weight of succinonitrile and then dissolving sufficiently dried $LiPF_6$ therein in such an amount as to result in a proportion of 1.0 mol/L. This battery was evaluated for high-voltage cycle characteristics and continuous-charge characteristics. The results of the evaluation are shown in Table 3.

TABLE 3

High-Voltage Cycle Characteristics and Continuous-Charge Characteristics

|  | High-voltage cycle characteristics (%) | Amount of gas generated through continuous charge (mL) | Residual capacity after continuous charge (%) |
| --- | --- | --- | --- |
| Example 8 | 88 | 0.38 | 92 |
| Comparative Example 7 | 70 | 0.39 | 87 |
| Comparative Example 8 | 64 | 0.29 | 86 |
| Example 9 | 88 | 0.33 | 94 |
| Example 10 | 89 | 0.33 | 94 |
| Example 11 | 88 | 0.30 | 93 |
| Example 12 | 90 | 0.28 | 96 |
| Example 13 | 90 | 0.31 | 98 |
| Example 14 | 91 | 0.34 | 97 |
| Comparative Example 9 | 61 | 0.28 | 79 |

As apparent from Table 3, the batteries according to the invention have excellent cycle characteristics, are inhibited from evolving a gas through high-temperature storage (through the continuous charge test), and can have improved discharge characteristics.

While the invention has been described in detail and with reference to specific embodiments thereof, it will be apparent to one skilled in the art that various changes and modifications can be made therein without departing from the spirit and scope thereof.

This application is based on a Japanese patent application filed on Jun. 2, 2006 (Application No. 2006-155251), the contents thereof being herein incorporated by reference.

INDUSTRIAL APPLICABILITY

Nonaqueous electrolytes capable of providing a battery having a high capacity and excellent in storability and cycle characteristics can be provided, and nonaqueous-electrolyte batteries produced with these electrolytes can be provided.

The invention claimed is:

1. A nonaqueous electrolyte solution, comprising:
   (1) an electrolyte; and
   (2) a nonaqueous solvent which dissolves the electrolyte, wherein the nonaqueous solvent comprises, based on a total weight of the solvent:
   (2a) from 0.001-10 wt % of a fluorinated cyclic carbonate selected from the group consisting of cis-4,5-difluoro-1,3-dioxolan-2-one, trans-4,5-difluoro-1,3-dioxolan-2-one, and 4,4-difluoro-1,3-dioxolan-2-one; and
   (2b) from 0.001-5 wt% of at least one dinitrile compound selected from the group consisting of malononitrile, succinonitrile, glutaronitrile, adiponitrile, and fumaronitrile.

2. The electrolyte solution of claim 1, wherein the nonaqueous solvent comprises, based on a total weight of the solvent, from 0.01-4 wt % of (2a) the fluorinated cyclic carbonate.

3. The electrolyte solution of claim 1, wherein the nonaqueous solvent comprises, based on a total weight of the solvent, from 0.1-2 wt % of (2a) the fluorinated cyclic carbonate.

4. The electrolyte solution of claim 1, wherein the nonaqueous solvent comprises, based on a total weight of the solvent, from 0.2-1 wt % of (2a) the fluorinated cyclic carbonate.

5. The electrolyte solution of claim 1, wherein the nonaqueous solvent comprises, based on a total weight of the solvent, from 0.25-0.5 wt % of (2a) the fluorinated cyclic carbonate.

6. The electrolyte solution of claim 1, wherein the dinitrile compound (2b) is succinonitrile.

* * * * *